(12) United States Patent
Shibata

(10) Patent No.: US 11,338,723 B2
(45) Date of Patent: May 24, 2022

(54) AUTOMOTIVE LAMP

(71) Applicant: KOITO MANUFACTURING CO., LTD., Tokyo (JP)

(72) Inventor: Yoshinori Shibata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/706,064

(22) Filed: Dec. 6, 2019

(65) Prior Publication Data
US 2020/0108766 A1    Apr. 9, 2020

Related U.S. Application Data

(63) Continuation of application No. PCT/JP2018/021496, filed on Jun. 5, 2018.

(30) Foreign Application Priority Data

Jun. 9, 2017 (JP) ................................. 2017-114321
Jun. 9, 2017 (JP) .............................. JP2017-114221

(51) Int. Cl.
*B60Q 1/14* (2006.01)
*G01J 1/42* (2006.01)

(52) U.S. Cl.
CPC .......... *B60Q 1/1423* (2013.01); *G01J 1/4257* (2013.01); *B60Q 2300/054* (2013.01); *B60Q 2300/112* (2013.01); *B60Q 2300/314* (2013.01); *G01J 2001/4247* (2013.01)

(58) Field of Classification Search
CPC .... B60Q 1/1423; B60Q 1/0023; B60Q 1/143; B60Q 2300/45; B60Q 2300/314; B60Q 2300/42; B60Q 2300/054; B60Q 2300/41; B60Q 2300/112; G06K 9/00791; G06K 9/2027; G06K 9/46611; H04N 9/3188;
(Continued)

(56) References Cited

U.S. PATENT DOCUMENTS

2007/0140527 A1    6/2007  Yamamoto et al.
2008/0084165 A1    4/2008  Otsuka et al.
(Continued)

FOREIGN PATENT DOCUMENTS

DE    102011081396 A1    2/2013
EP      2 065 253 A2     6/2009
(Continued)

OTHER PUBLICATIONS

International Search Report (Form PCT/ISA/210) dated Sep. 11, 2018, in corresponding international Application No. PCT/JP2018/021496. (5 pages).
(Continued)

*Primary Examiner* — Henry Luong
(74) *Attorney, Agent, or Firm* — Buchanan Ingersoll & Rooney PC

(57) ABSTRACT

An automotive lamp is capable of controlling a light distribution pattern PTN based on an image captured by a camera unit. The automotive lamp is capable of switching between multiple control modes designed with different combinations of the spatial resolution of the light distribution pattern PTN and the update speed of the light distribution pattern PTN.

10 Claims, 13 Drawing Sheets

(58) Field of Classification Search
CPC .................. H04N 9/3194; G01J 1/4257; G01J 2001/4247; F21S 41/645; F21S 41/675
See application file for complete search history.

(56) References Cited

U.S. PATENT DOCUMENTS

| | | | |
|---|---|---|---|
| 2008/0130302 A1* | 6/2008 | Watanabe | B60Q 1/085 362/466 |
| 2011/0012511 A1 | 1/2011 | Watanabe | |
| 2012/0216208 A1 | 8/2012 | Takemura et al. | |
| 2014/0043805 A1 | 2/2014 | Yamamura | |
| 2015/0085514 A1 | 3/2015 | Yagi | |
| 2015/0149045 A1 | 5/2015 | Mizuno et al. | |
| 2016/0341389 A1 | 11/2016 | Hoshino | |

FOREIGN PATENT DOCUMENTS

| | | | | |
|---|---|---|---|---|
| EP | 3 135 536 A1 | 3/2017 | | |
| JP | 4059079 B2 * | 3/2008 | | B60Q 1/50 |
| JP | 2008-094127 A | 4/2008 | | |
| JP | 2009-132230 A | 6/2009 | | |
| JP | 2009257981 A * | 11/2009 | | |
| JP | 2011-037414 A | 2/2011 | | |
| JP | 2012-227102 A | 11/2012 | | |
| JP | 2013-097885 A | 5/2013 | | |
| JP | 2015-064964 A | 4/2015 | | |
| JP | 2017-043149 A | 3/2017 | | |

OTHER PUBLICATIONS

International Preliminary Report on Patentability (Form PCT/IB/373) and the Written Opinion of the International Searching Authority (Form PCT/ISA/237) dated Dec. 10, 2019, in corresponding international Application No. PCT/JP2018/021496. (15 pages).

Office Action (Communication pursuant to Rule 164(1) EPC/The partial supplementary European search report) dated Feb. 9, 2021, by the European Patent Office in corresponding European Patent Application No. 18813992.7. (17 pages).

Extended Search Report issued by the European Patent Office in corresponding European Patent Application No. 21163634.5-1209 dated Jun. 17, 2021 (17 pages).

* cited by examiner

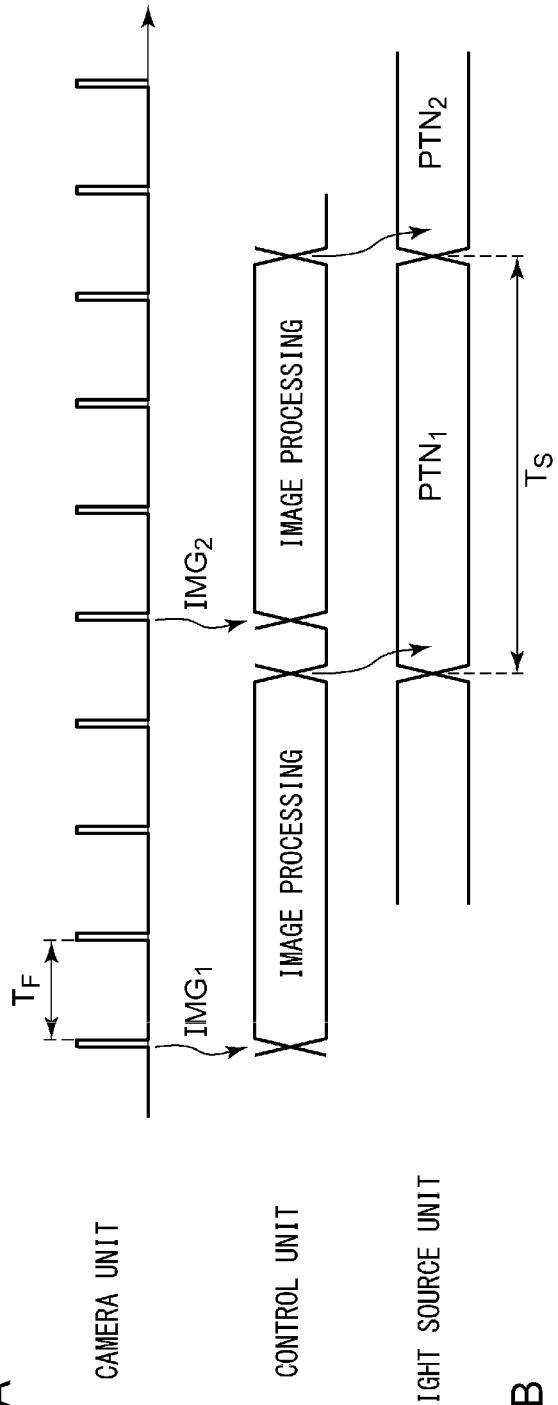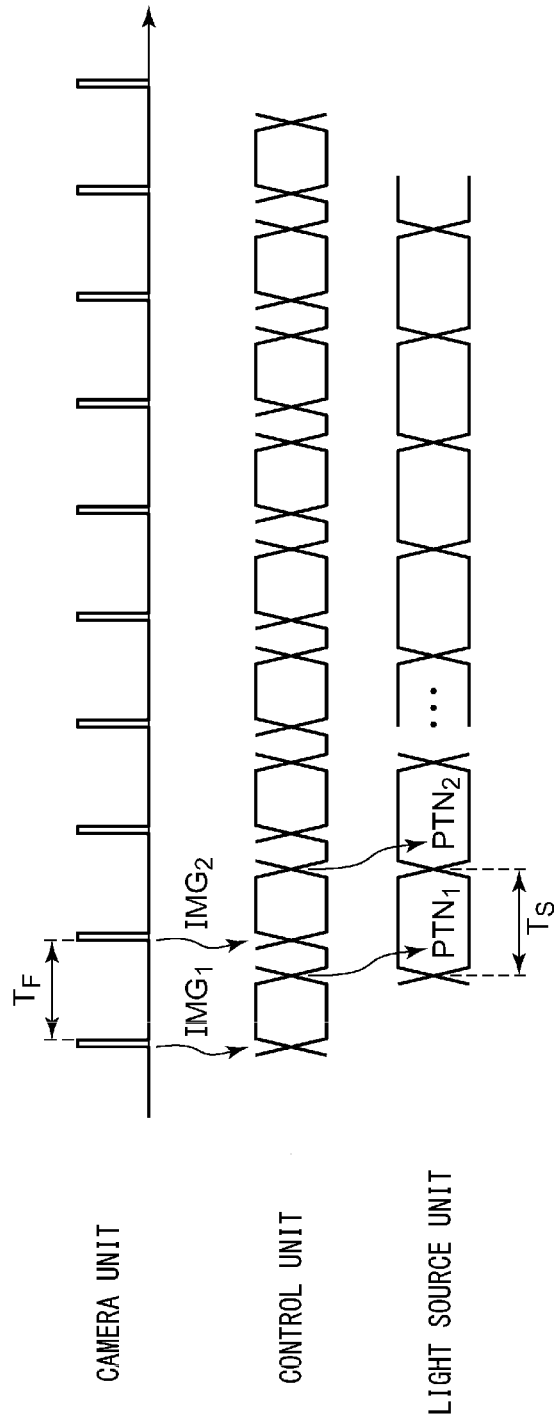

230A

230B

FIG. 13
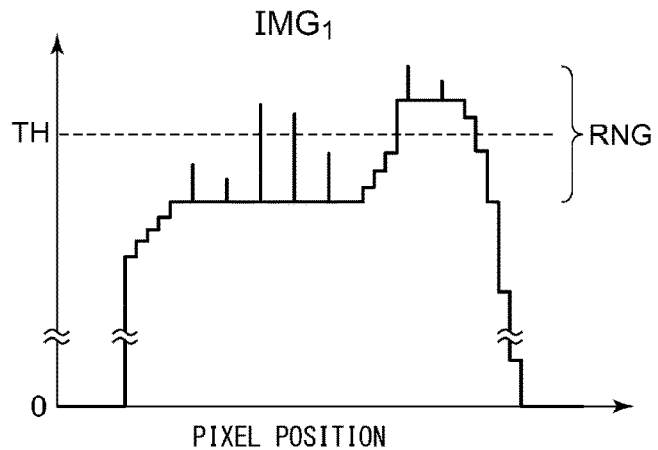
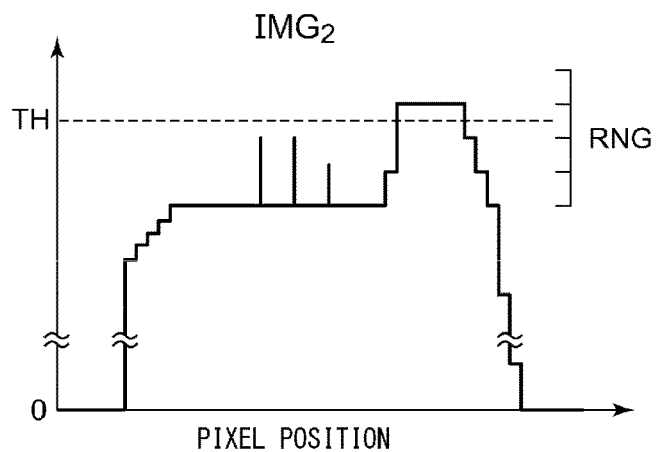
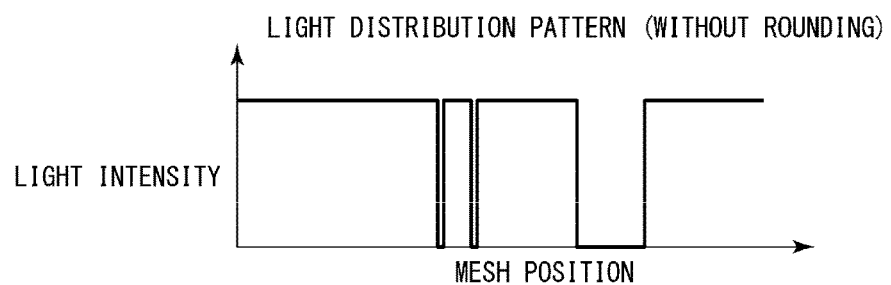
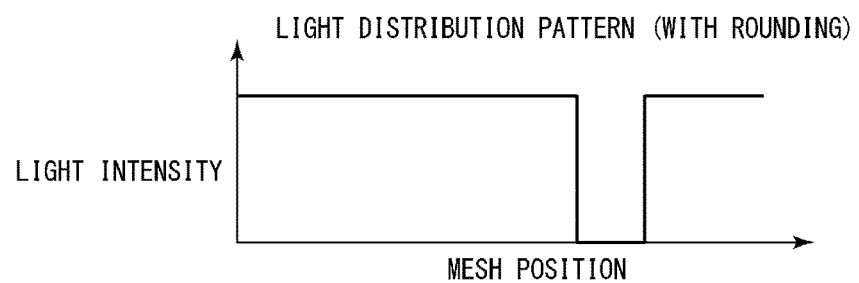

AUTOMOTIVE LAMP

BACKGROUND OF THE INVENTION

1. Field of the Invention

The present invention relates to an automotive lamp.

2. Description of the Related Art

When driving at night or through a tunnel, an automotive lamp plays an important role in supporting safe driving. However, in a case in which a wide region ahead of a vehicle is illuminated with high light intensity prioritizing the driver's visibility, this leads to a problem of imparting glare to a driver of a leading vehicle or a oncoming vehicle (which will be referred to as a "forward vehicle") or a pedestrian ahead of the user's vehicle.

In recent years, the ADB (Adaptive Driving Beam) technique has been proposed in which a light distribution pattern is dynamically and adaptively controlled based on the state of the surroundings of the vehicle. With the ADB technique, the presence or absence of a forward vehicle or a pedestrian ahead of the vehicle is detected, and the illumination is reduced or turned off for a region that corresponds to such a vehicle or pedestrian thus detected, thereby reducing glare imparted to a driver of the forward vehicle or a pedestrian.

SUMMARY OF THE INVENTION

The present invention has been made in view of such a situation. Accordingly, it is an exemplary purpose of an embodiment of the present invention to provide an automotive lamp that is capable of forming a light distribution pattern that provides improved visibility. Also, it is another purpose of an embodiment of the present invention to provide an automotive lamp that is capable of forming a light distribution pattern that allows an in-vehicle camera to easily detect a target.

As a result of investigating a lighting device that controls a light distribution based on image data of a forward area ahead of a vehicle captured by a camera, the present inventors have come to recognize the following problem. Typically, such an automotive lamp is used mainly at night. Accordingly, a dark target must be captured by the camera.

In a case in which an image of a dark field is captured with sufficient brightness that allows an object to be detected, there is a need to raise the sensitivity of the camera. However, in a case of raising the intensity, this leads to degradation of the S/N ratio. In a case in which light distribution is controlled based on image data with a low S/N ratio, the noise component of the image data has an effect on a light distribution pattern to be projected. This has the potential to cause degradation of visibility. It should be noted that such a problem is by no means within the scope of common and general knowledge of those skilled in this art.

The present invention has been made in view of such a situation. Accordingly, it is an exemplary purpose of an embodiment of the present invention to provide an automotive lamp that is capable of forming a light distribution pattern with reduced noise effects.

An embodiment of the present invention relates to an automotive lamp. The automotive lamp is structured to be capable of controlling a light distribution pattern based on an image captured by a camera, and to be capable of switching multiple control modes with different combinations of a spatial resolution of the light distribution pattern and an update speed of the light distribution pattern.

Another embodiment to the present invention relates to a control apparatus for an automotive lamp or relates to the automotive lamp. The control apparatus comprises an image processing unit structured to receive initial image data captured by a camera, to generate intermediate image data that corresponds to the initial image data, and to generate light intensity control data that determines a light intensity distribution to be provided by the automotive lamp based on the intermediate image data. The effective number of gradations to be used in the intermediate image data is determined for each pixel such that it is smaller than the number of gradations used in the initial image data when the pixel value of the corresponding pixel of the initial image data is within a predetermined range.

It should be noted that any combination of the components described above or any manifestation thereof may be mutually substituted between a method, apparatus, system, or the like, which are also effective as an embodiment of the present invention.

With an embodiment of the present invention, such an arrangement is capable of generating a light distribution pattern with improved visibility. Also, this arrangement is capable of generating a light distribution pattern that allows an in-vehicle camera to easily recognize a target. Also, with another embodiment of the present invention, such an arrangement is capable of generating a light distribution with reduced noise effects.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 4A and 4B are time charts showing light distribution control of the automotive lamp in different control modes;

FIG. 13 is a diagram for explaining image processing according to a first example;

DETAILED DESCRIPTION OF THE INVENTION

Figure 1:
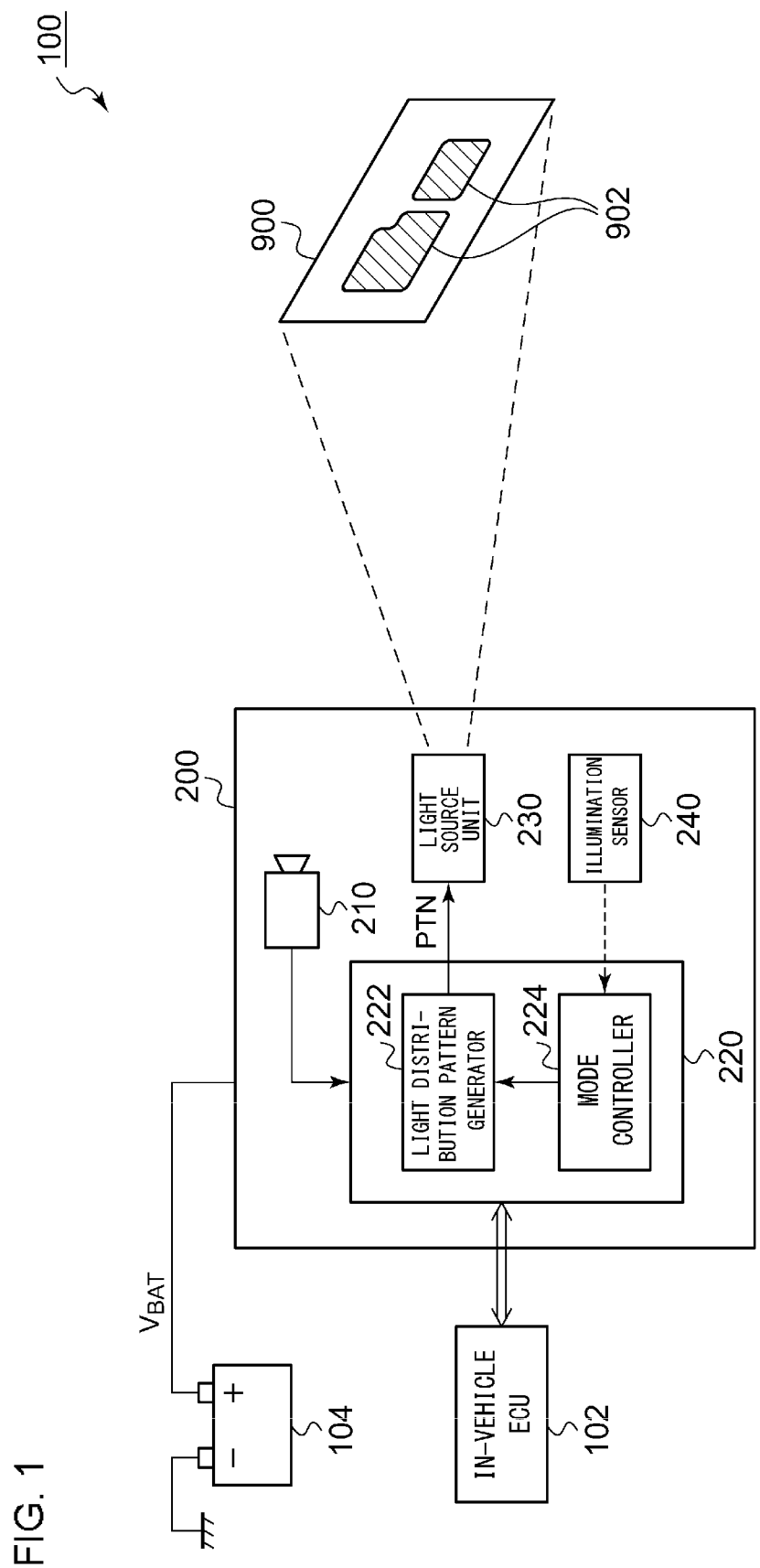
FIG. 1 is a block diagram showing an automotive lamp according to a first embodiment.

First, description will be made regarding the outline of an automotive lamp according to several representative embodiments.

1. An embodiment of the present invention relates to an automotive lamp. The automotive lamp is structured to be capable of controlling a light distribution pattern based on an image captured by a camera, and to be capable of switching multiple control modes with different combinations of a spatial resolution of the light distribution pattern and an update speed of the light distribution pattern.

By performing suitable signal processing according to the driving environment or the user's preference, such an arrangement is capable of generating a suitable light distribution pattern.

As an embodiment, the automotive lamp may comprise: a light distribution pattern generator structured to generate a light distribution pattern based on an image captured by a camera; a light source unit structured to emit light to a region ahead of a vehicle according to the light distribution pattern; and a mode controller structured to adaptively control a combination of a spatial resolution of the light distribution pattern and an update speed at which the light distribution pattern is updated.

Also, the multiple control modes may include a first mode in which the light distribution pattern is generated with relatively high resolution and relatively low speed, and a second mode in which the light distribution pattern is generated with relatively low resolution and relatively high speed.

This arrangement does not require a high-cost hardware component that provides high-speed processing. Also, the human eye has the characteristic of recognizing a high-speed moving object with only a low resolution, and of recognizing a low-speed moving object with a high resolution. Accordingly, this arrangement is capable of generating a light distribution pattern that matches the characteristics of the human eye.

Also, the control mode may be adaptively selected according to a driving environment. Also, such an arrangement allows the driver to manually select the control mode.

Also, the control mode may be adaptively selected according to environmental illumination. The human eye has characteristics that change according to a change between a bright environment and a dark environment. Accordingly, by giving consideration to the environmental illumination, such an arrangement is capable of providing a light distribution pattern with improved visibility. Also, a camera involves a change of exposure time for each frame according to a change between a bright environment and a dark environment under the condition in that the camera sensitivity is maintained at the same value. Accordingly, by giving consideration to the environmental illumination, such an arrangement is capable of providing an operation that corresponds to the operation of the camera.

Also, the environmental illumination may be detected based on the image captured by the camera. By using the camera as an illumination sensor, this arrangement allows the number of hardware components to be reduced.

Also, the control mode may be adaptively selected according to the driving speed. The driving speed may be used as an indicator of the moving speed of an object to be illuminated (illumination target).

Also, the control mode may be adaptively selected according to the speed of an object to be illuminated (illumination target).

Also, the control mode may be selected based on the spatial frequency of the image captured by the camera. The control mode may be adaptively selected based on the moving speed of an object included in an image captured by the camera.

The control mode may be selected based on the kind of road on which the user's vehicle is traveling.

Also, the image captured by the camera may be divided into multiple sub-regions. Also, the control mode may be set for each sub-region. Also, the image may be divided into a sub-region where it is relatively bright and a sub-region where it is relatively dark. Also, the image may be divided into a sub-region where a target moves at a relatively high displacement speed and a sub-region where a target moves at a relatively low displacement speed.

2. Another embodiment of the present invention relates to a control apparatus for an automotive lamp. The control apparatus comprises an image processing unit structured to receive initial image data captured by a camera, to generate intermediate image data that corresponds to the initial image data, and to generate light intensity control data that determines a light intensity distribution (light distribution pattern) to be provided by the automotive lamp based on the intermediate image data. The effective number of gradations to be used in the intermediate image data is determined for each pixel such that it is smaller than the number of gradations used in the initial image data when a pixel value of the corresponding pixel of the initial image data is within a predetermined range.

The light distribution pattern is handled as a set of multiple individual regions (meshes). The light intensity of each mesh is determined based on the pixel value of the pixel at the corresponding position included in the initial image data. With this arrangement, noise is superimposed on each pixel value. In a case in which noise is included in a particular pixel value range, in some cases, noise effects are noticeable in the light distribution pattern. In order to solve such a problem, when a pixel included in the initial image data has a significant noise effect on the final light intensity distribution, the effective number of gradations is reduced for the pixel. This arrangement is capable of generating a light distribution with reduced noise effects due to a camera. By reducing the number of gradations for only a predetermined range, this arrangement maintains the original high number of gradations for the pixels where noise is not noticeable.

The predetermined range may be a range from zero up to a predetermined upper limit value. Also, the predetermined range may be a range from a predetermined lower limit value up to the maximum gradation value. Also, multiple predetermined ranges may be employed.

Also, processing for generating the light intensity control data may include comparing a pixel value of the intermediate image data or image data generated based on the intermediate image data with a threshold value. In this case, by determining the predetermined range according to the threshold value, this arrangement is capable of reducing noise effects.

Also, processing for generating the light intensity control data may include changing the contrast of the intermediate image data or image data generated based on the intermediate image data. In a case in which the contrast is lowered (or raised), in some cases, noise in a dark portion is amplified. In order to solve such a problem, by reducing the number of gradations for a predetermined range that corresponds to a dark portion, this arrangement allows the noise effects to be reduced.

Also, processing for generating the light intensity control data may include gradation inversion of the pixel values of the intermediate image data or image data generated based on the intermediate image data. In this case, as the intermediate image data becomes dark, the light intensity is raised. Accordingly, the noise included in a dark portion is emphasized in a bright region in the light intensity distribution. In order to solve such a problem, by reducing the number of gradations of the predetermined range that corresponds to such a dark portion, this arrangement allows the noise effects to be reduced.

The image processing unit may compare each pixel value of the intermediate image data with a threshold value, and may generate the light intensity control data based on the comparison result. Directing attention to multiple adjacent pixels, in a case in which a given pixel value exceeds the threshold value and another pixel value does not exceed the threshold value, the noise effects on the light intensity control data become noticeable. In this case, by reducing the number of gradations of the intermediate image data, this arrangement allows the noise effects to be reduced.

Also, processing for generating the intermediate image data may include multiplying each pixel value of the initial image data by a coefficient that is smaller than 1.

Also, processing for generating the intermediate image data may include rounding lower N bits (N represents an integer of 1 or more) of the pixel values of the initial image data.

Also, the image processing unit may change the degree of reducing the number of gradations according to the amplitude of noise included in the initial image data. In some cases, the amount of noise changes depending on the temperature and the environment. This arrangement allows the noise effects to be appropriately reduced according to the situation.

The above is the outline of the automotive lamp. Description will be made below with reference to the drawings regarding the present invention based on preferred embodiments. The embodiments have been described for exemplary purposes only, and are by no means intended to restrict the present invention. Also, it is not necessarily essential for the present invention that all the features or a combination thereof be provided as described in the embodiments. The same or similar components, members, and processes are denoted by the same reference numerals, and redundant description thereof will be omitted as appropriate.

The scale and the form of each portion in the drawings are determined for convenience for ease of description, and are by no means intended to be restricted in particular in the absence of explicit definition. In a case in which terms such as "the first", "the second", or the like are employed in the present specification and claims, such terms are by no means to indicate order or importance. Rather, such terms are used to distinguish a given component from another component.

FIG. 1 is a block diagram showing an automotive lamp system according to a first embodiment. An automotive lamp system 100 includes an automotive lamp 200, an in-vehicle ECU (Electronic Control Unit) 102, and a battery 104. The battery voltage $V_{BAT}$ generated by the battery 104 is supplied to the automotive lamp 200 as a power supply voltage. The in-vehicle ECU 102 and the automotive lamp 200 are each configured to conform to a protocol such as CAN (Controller Area Network), LIN (Local Internet Network), or the like, which allows these devices to communicate with each other. The in-vehicle ECU 102 controls the on/off state of the automotive lamp 200. Furthermore, the in-vehicle ECU 102 transmits vehicle information such as vehicle speed information, steering information, etc., to the automotive lamp 200. Furthermore, this arrangement allows the automotive lamp 200 to transmit a fail signal or the like to the in-vehicle ECU 102.

The automotive lamp 200 is configured to dynamically and adaptively control a light distribution pattern PTN based on an image (which will also be referred to as a "camera image IMG" hereafter) captured by a camera unit 210. It should be noted that the camera image IMG corresponds to a single piece of frame data that forms a moving image. The camera unit 210 may include only a single camera. Also, the camera unit 210 may include multiple cameras configured to provide different resolutions and/or different frame rates. In a case in which the camera unit 210 includes multiple cameras, the camera image IMG collectively represents the output data of the multiple cameras.

The light distribution pattern PTN represents a two-dimensional light intensity distribution having an illumination pattern 902 formed by the automotive lamp 200 on a virtual vertical screen 900 ahead of the user's vehicle. The automotive lamp 200 is capable of adaptively switching the control mode between the multiple control modes for generating the light distribution pattern PTN. There is a difference in a combination of the spatial resolution of the light distribution pattern PTN and the update speed (switching speed) thereof between the multiple control modes.

The light distribution pattern PTN is divided into multiple meshes (regions). Each mesh is provided with a uniform light intensity. The spatial resolution of the light distribution pattern PTN corresponds to the fineness (roughness) of the meshes.

Figure 2A:
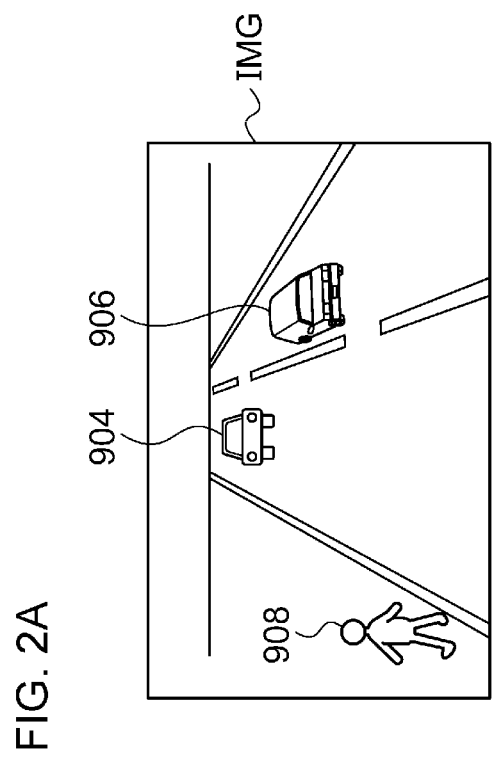
FIGS. 2A through 2C are diagrams for explaining the resolution of a light distribution pattern.
Figure 2B:
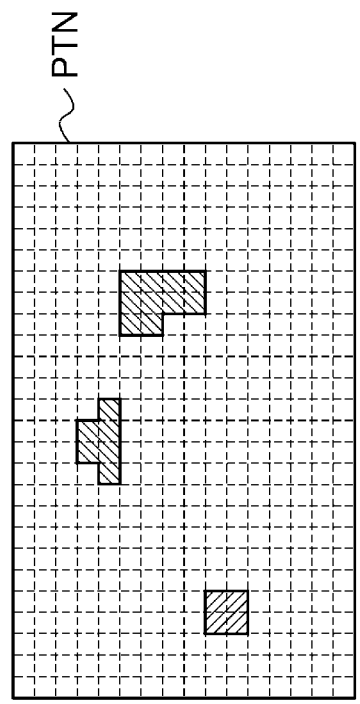
Figure 2C:
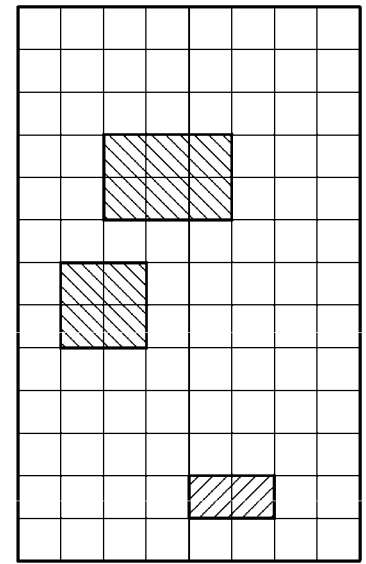

FIGS. 2A through 2C are diagrams for explaining the resolution of the light distribution pattern PTN. FIG. 2A shows an example of the camera image IMG. FIGS. 2B and 2C are diagrams each showing an example of the light distribution pattern PTN that corresponds to the camera image IMG shown in FIG. 2A. Here, for ease of description, description will be made regarding an example in which a predetermined target is extracted from the camera image IMG, and a particular mesh where the predetermined target exists is shielded (i.e., with a light intensity of zero). Such a predetermined target is a target to which glare is not to be imparted. Examples of such a predetermined target include a leading vehicle 904, an oncoming vehicle 906, and a pedestrian 908. In FIGS. 2B and 2C, the region to be shielded is hatched. FIG. 2B shows a light distribution pattern PTN having a resolution that is higher than that shown in FIG. 2C. In a case in which the light distribution pattern is generated with higher resolution, this arrangement is capable of providing higher-precision shielding according to the shape of the predetermined target.

In a case of further raising the resolution of the light distribution pattern PTN, this arrangement allows only a rear window portion of the leading vehicle 904 or only a front window portion of the oncoming vehicle 906 to be shielded while proactively raising the light intensity for the vehicle body. Similarly, such an arrangement allows only the face portion of the pedestrian 908 to be shielded while proactively raising the light intensity for the body portion. This allows the driver's visibility to be further improved while preventing the occurrence of glare.

Returning to FIG. 1, description will be made regarding a specific configuration of the automotive lamp 200. The automotive lamp 200 includes a control unit 220 and a light source unit 230 in addition to the camera unit 210. It should be noted that FIG. 1 shows an arrangement in which the camera unit 210 is built into the automotive lamp 200. Also, the camera unit 210 may be provided on the vehicle side.

The control unit 220 includes a light distribution pattern generator 222 and a mode controller 224. The control unit 220 is also referred to as a "lighting device ECU". The light distribution pattern generator 222 generates a light distribution pattern PTN based on the camera image IMG. The control unit 220 can be configured as a digital processor. For example, the control unit 220 may be configured as a combination of a CPU or a microcontroller and a software program. Also, the control unit 220 may be configured as an FPGA (Field Programmable Array), ASIC (Application Specified IC), or the like.

The light source unit 230 is configured to receive data for indicating the light distribution pattern PTN from the light distribution pattern generator 222, and to form a light intensity distribution in a region ahead of the vehicle according to the light distribution pattern PTN. The configuration of the light source unit 230 is not restricted in particular. For example, the light source unit 230 may include a semiconductor light source such as an LD (laser diode), LED (light-emitting diode), or the like, and a lighting circuit that drives the semiconductor light source so as to turn on the semiconductor light source. In order to form the light intensity distribution that corresponds to the light distribution pattern PTN, the light source unit 230 may include a matrix pattern forming device such as a DMD (Digital Mirror Device), liquid crystal device, or the like.

The mode controller 224 adaptively controls a combination of the spatial resolution of the light distribution pattern PTN and the update speed (frame rate) of the light distribution pattern PTN, i.e., the control mode for the light distribution generator 222.

The above is the basic configuration of the automotive lamp 200. Next, description will be made regarding the operation thereof.

Figure 3A:
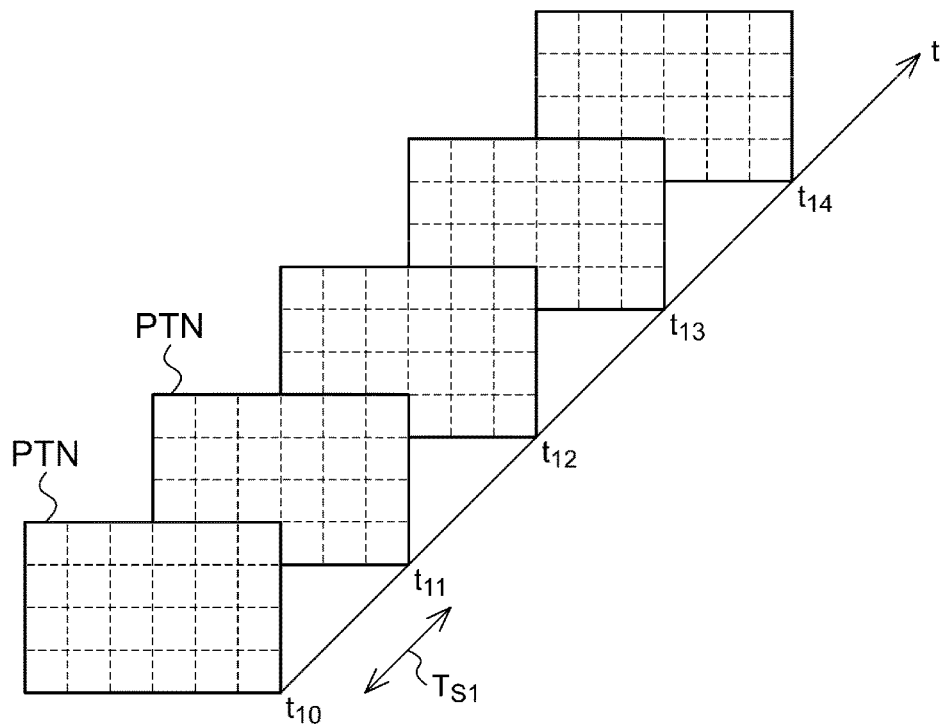
FIGS. 3A and 3B are diagrams for explaining generation of the light distribution pattern in different control modes.
Figure 3B:
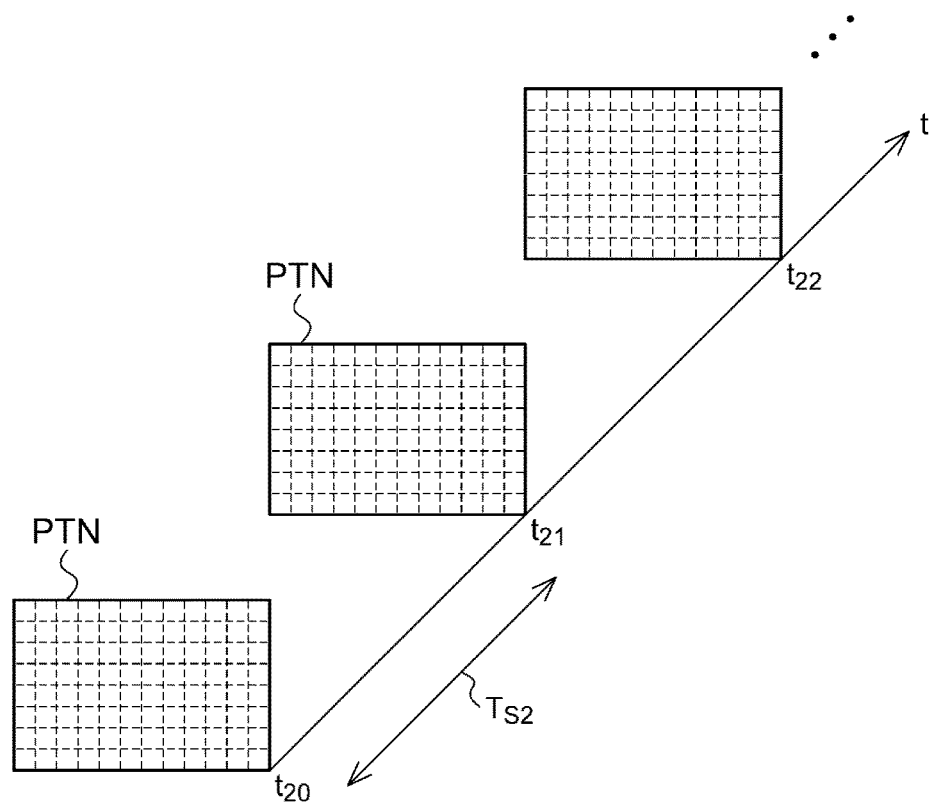

FIGS. 3A and 3B are diagrams for explaining the formation of the light distribution pattern PTN in different control modes. FIG. 3A shows a control mode with the distribution pattern PTN update period $T_{S1}$ that is shorter than the update period $T_{S2}$ employed in the control mode shown in FIG. 3B. Furthermore, the control mode shown in FIG. 3A provides the light distribution pattern PTN with a resolution that is lower than that provided by the control mode shown in FIG. 3B.

FIGS. 4A and 4B are time charts showing the light distribution control of the automotive lamp 200 in different control modes. FIG. 4A shows a control mode designed prioritizing the resolution. The camera image IMG is generated for every predetermined frame period $T_F$. The control unit 220 receives the camera image IMG for every predetermined number of frames, and generates the light distribution pattern PTN by image processing based on the camera image IMG thus received. The processing time $T_P$, which is a period of time required to generate a single high-resolution light distribution pattern PTN based on a single camera image IMG, is longer than the frame period $T_F$. Accordingly, the update period $T_S$ of the light distribution pattern PTN is restricted by the processing time $T_P$.

FIG. 4B shows a control mode designed prioritizing the update speed. The control unit 220 receives the camera image IMG for every frame, and generates the light distribution pattern PTN by image processing based on the camera image IMG thus received. The processing time $T_P$, which is a period of time required to generate a single low-resolution light distribution pattern PTN based on a single camera image IMG, is shorter than the frame period $T_F$.

Figure 5:
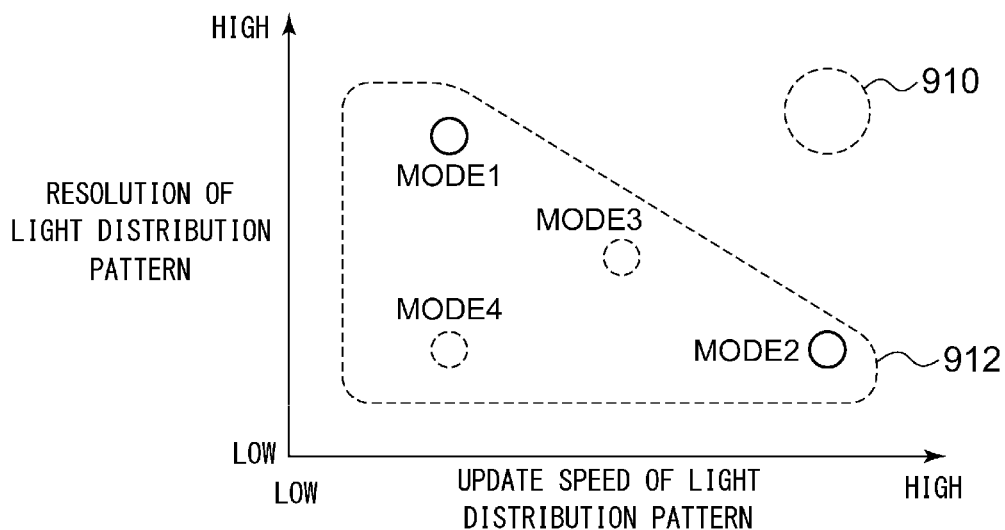
FIG. 5 is a diagram for explaining multiple control modes according to an example.

FIG. 5 is a diagram for explaining the multiple control modes according to an example. The horizontal axis represents the update speed (the reciprocal of the update period), and the vertical axis represents the resolution. The light distribution pattern generator 222 is configured to be switched between at least a first mode MODE1, and a second mode MODE2. In the first mode MODE1, the light distribution generator 222 generates the light distribution pattern PTN with a relatively high resolution and low speed. In the second mode MODE2, the light distribution generator 222 generates the light distribution pattern PTN with a relatively low resolution and high speed.

As described above, the control unit 220 may be configured as a processor such as a microcontroller, CPU, or the like. The calculation amount required for the light distribution pattern generator 222 rises according to an increase in the resolution of the light distribution pattern PTN, and according to the update speed of the light distribution pattern PTN.

In FIG. 5, in order to generate the light distribution pattern PTN in a region 910 that corresponds to the highest resolution and the highest update speed, the processor is required to have very high calculation power. However, typically, such a high-speed processor has a problem of a high cost. In many cases, it is difficult to mount such a high-speed processor on the automotive lamp from the cost viewpoint. In other words, it can be said that, in a case in which the processor does not have such high calculation power, there is a tradeoff relation between the resolution and the update speed. In a case in which there is such a hardware restriction, the operation region of the light distribution pattern generator 222 may preferably be restricted to a region 912 shown in FIG. 5. This allows the calculation power required for the processor to be reduced. Such an arrangement does not require such a high-cost CPU or the like. That is to say, this arrangement allows a low-cost processor to be employed.

A third mode MODE3 may be supported as an intermediate mode of the first mode MODE1 and the second mode MODE2 in addition to the first mode MODE1 and the second mode MODE2 for operating in a sub-region within the region 912. Furthermore, a fourth mode MODE4 may be supported as a combination of a low resolution mode and a low update speed mode.

By supporting the first mode MODE1 and the second mode MODE2, such an arrangement provides the following effect. The human eye is capable of recognizing a high-speed object with only a low resolution. In contrast, the human eye is capable of recognizing a low-speed object with high resolution. Accordingly, by configuring the control mode to be switched between the first mode MODE1 and the second mode MODE2, this arrangement is capable of generating a light distribution pattern that matches the physiological characteristics of the human eye.

Next, description will be made regarding the switching of the control mode. Preferably, the control mode is adaptively selected according to the driving environment. Specifically, the control mode can be selected based on at least one from among the following three parameters. Alternatively, the control mode may be selected giving consideration to the multiple parameters.

1. Ambient Brightness (Environmental Illumination).

As the first parameter, the ambient brightness is employed. There is a large difference in the ambient brightness even in an environment in which a headlight is to be turned on. For example, it is brighter in early evening or early morning than at night. Also, it is brighter in an urban area where there are many streetlights than in a suburban area where there are few streetlights even at the same time of night. Also, there is a large difference in brightness between tunnel interiors depending on the number of illumination devices or the luminance provided by each illumination device.

The human eye includes rod cells having low resolution and high sensitivity and cone cells having high resolution and low sensitivity. It is known that, in a bright environment, the cone cells are activated. Conversely, in a dark environment, the rod cells are activated. That is to say, the human eye has low resolution in a dark environment. Accordingly, it can be same that, in a case in which the light distribution pattern PTN is controlled with high resolution in such a dark environment, the human eye is not able to recognize the light distribution pattern PTN with such a high resolution.

Accordingly, the mode controller 224 may select the control mode according to the ambient brightness. Specifically, as it becomes bright, the mode controller 224 may select a higher-resolution control mode. Conversely, as it becomes dark, the mode controller 224 may select a lower-resolution control mode. In a case in which the first mode MODE1 through the third mode MODE3 shown in FIG. 5 are selectable, when the surroundings are bright, the mode controller 224 may select the first mode MODE1. As it becomes dark, the mode controller 224 may select the third mode MODE3 and the second mode MODE2 in this order.

In order to measure the ambient brightness, as shown in FIG. 1, the automotive lamp 200 may be provided with an illumination sensor 240 that measures the environmental illumination. The mode controller 224 may select a control mode having a suitable resolution according to the environmental illumination.

Instead of the illumination sensor 240, the camera unit 210 may be used as an illumination sensor. The camera image IMG includes information with respect to the environmental illumination. Accordingly, the mode controller 224 may estimate the environmental illumination by subjecting the camera image IMG to calculation processing. For example, the average of values of multiple pixels (pixel values) of the camera image IMG may be calculated so as to estimate the environmental illumination. Also, the pixel values may be extracted from a region of the camera image IMG that is not illuminated by output light emitted from the automotive lamp 200, and the environmental illumination may be estimated based on the pixel values thus extracted. By estimating the environmental illumination based on the camera image IMG, this arrangement allows the illumination sensor to be omitted.

2. Relative Speed of an Illumination Target With Respect to the User's Vehicle

As a second parameter, the relative speed of an illumination target (target) with respect to the user's vehicle is employed. Examples of such an illumination target as used here include a vehicle, road sign, pedestrian, road surface, delineator, streetlight, etc. In other words, the control mode may be selected according to the time frequency of the view ahead of the user's vehicle. That is to say, in a case in which the illumination target moves at a relatively high speed with respect to the user's vehicle, a control mode with a high update speed may be selected. Also, the control mode may be selected such that its update speed becomes low according to a reduction in the relative speed. In a case in which the first mode MODE1 through the third mode MODE3 shown in FIG. 5 are selectable, in a situation in which the relative speed is high, the second mode MODE2 may be selected. Also, the third mode MODE3 and the first mode MODE1 may be selected in this order according to a reduction in the relative speed.

For example, the mode controller 224 may switch the control mode based on the displacement speed of the illumination target included in the camera image IMG. This enables control giving consideration to the relative speed of the illumination target with respect to the user's vehicle.

Also, in many cases, when the user's vehicle is driven at a high speed, the relative speed tends to increase. Also, in many cases, when the user's vehicle is driven at low speed, the relative speed tends to decrease. Accordingly, the light distribution pattern generator 222 may switch the control mode based on the user's vehicle driving speed.

3. Shape and Configuration of Illumination Target

As a third parameter, the spatial resolution of the shape and configuration of the illumination target (or target) is employed. In other words, the third parameter is the spatial resolution of the view ahead of the vehicle. When the view has a high spatial frequency, a control mode with a high resolution may be selected. As the spatial frequency becomes lower, a control mode with a low resolution may be selected. In a case in which the first mode MODE1 through the third mode MODE3 shown in FIG. 5 are selectable, in a situation in which the spatial frequency is high, the first mode MODE1 may be selected. As the spatial frequency becomes lower, the third mode MODE3 and the second mode MODE2 may be selected in this order.

The spatial frequency of the view ahead of the vehicle may be calculated based on the camera image IMG. The mode controller 224 may subject the image data to Fourier transformation so as to calculate the spatial frequency.

The mode controller 224 may directly or indirectly acquire each of the first parameter through the third parameter so as to select the control mode. Also, the first parameter through the third parameter may be estimated based on the driving environment. Accordingly, the mode controller 224 may select the control mode based on the driving environment.

With an example, the control mode may be selected according to the kind of the road on which the user's vehicle is traveling. The kinds of roads can be classified into urban areas, suburban areas, expressways, tunnels, etc. The kind of road may be judged based on information received from a car navigation system, based on information with respect to the user's vehicle such as vehicle speed information, steering information, etc., or based on an image captured by the camera unit 210.

Directing attention to the first parameter, it is relatively bright in an urban area and the user is able to recognize an object with high resolution. Accordingly, the first mode MODE1 or the third mode MODE3 may be selected. Conversely, it is relatively dark in a suburban area and the human eye is only able to recognize an object with low resolution. Accordingly, the second mode MODE2 or the third mode MODE3 may be selected.

Directing attention to the second parameter, in many cases, the traveling speed of the vehicle is low in an urban area, which tends to reduce the relative speed of the illumination target with respect to the user's vehicle. Accordingly, in this case, the first mode MODE1 or the third mode MODE3 may be selected. Conversely, the traveling speed of the vehicle increases on an expressway or in a suburban area, which tends to increase the relative speed of the illumination target with respect to the user's vehicle. Accordingly, in this case, the second mode MODE2 or the third mode MODE3 may be selected.

Directing attention to the third parameter, in an urban area, there are relatively many small-size targets such as pedestrians, road signs, or the like. Accordingly, the spatial frequency tends to be high in such an urban area. Accordingly, in this case, the first mode MODE1 or the third mode MODE3 may be selected. On the other hand, on an expressway or in a suburban area, there are a relatively small number of pedestrians or road signs. Accordingly, the spatial frequency tends to be low. In this case, the second mode MODE2 or the third mode MODE3 may be selected.

Description has been made above regarding an example in which a single light distribution pattern is generated in a single control mode. However, the present invention is not restricted to such an example. Also, the single camera image IMG may be divided into multiple sub-regions. Also, an optimum control mode may be selected for each sub-region.

Figure 6A:
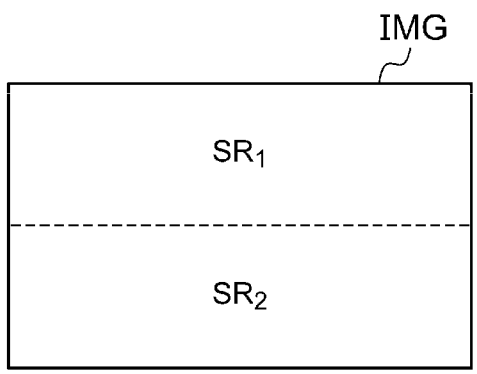
FIGS. 6A and 6B are diagrams each showing a camera image divided into multiple sub-regions.
Figure 6B:
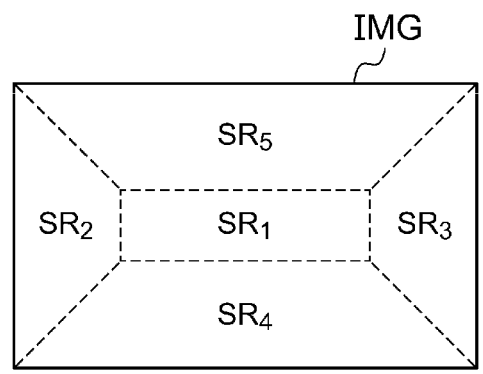

FIGS. 6A and 6B are diagrams each showing the camera image IMG divided into multiple sub-regions. FIG. 6A shows an example in which the camera image IMG is divided into two sub-regions, i.e., an upper region and a lower region. FIG. 6B shows an example in which the camera image IMG is divided into five sub-regions, i.e., a central region, upper region, lower region, left region, and right region.

There is a large difference between sub-regions in the tendencies of the brightness of the view ahead of the user's vehicle (first parameter), the time frequency (second parameter), and the spatial frequency (third parameter). Accordingly, by dividing the camera image IMG into multiple sub-regions, such an arrangement is capable of providing more suitable control.

In the dividing pattern shown in FIG. 6A, the upper sub-region $SR_1$ can include an illumination target at a longer distance than that in the lower sub-region $SR_2$. Accordingly, in many cases, in the upper sub-region $SR_1$, the displacement speed is low, i.e., the time frequency is low. Furthermore, an object at a long distance appears small as compared with an object at a short distance. Accordingly, in the upper sub-region $SR_1$, in many cases, the spatial frequency is high. Accordingly, in the upper sub-region $SR_1$, a mode prioritizing the resolution may be used. In contrast, in the lower sub-region $SR_2$, a mode prioritizing the update speed may be used.

In the dividing pattern shown in FIG. 6B, the central sub-region $SR_1$ includes a vanishing point. Accordingly, the central sub-region $SR_1$ can include an illumination target at a longer distance than those in the other sub-regions $SR_2$ through SR5, leading to a low displacement speed. That is to say, in the central sub-region $SR_1$, in many cases, the time frequency is low, and the spatial frequency is high. Accordingly, in this case, in the sub-region $SR_1$, a mode prioritizing the resolution may be used.

In contrast, in the left and right sub-regions $SR_2$ and $SR_3$, there is a high possibility of the appearance of an oncoming vehicle or a vehicle overtaking the user's vehicle. In many cases, such a target moves at a high displacement speed. Accordingly, in the sub-region $SR_2$ or SR3, a mode prioritizing the update speed may be used.

It should be noted that the dividing pattern may be adaptively switched according to the kind of road on which the vehicle is traveling, the user's vehicle speed, or the like.

Next, description will be made regarding image processing in the light distribution pattern generator 222.

As a simplest example, the light distribution pattern generator 222 may detect a particular target based on the camera image IMG, and may perform control so as to shield a portion that corresponds to the target thus detected.

As an advanced example, the light distribution pattern generator 222 may change the light intensity for each mesh of the light distribution pattern PTN based on the value of the corresponding pixel (pixel value) that corresponds to the mesh. Such control will be referred to as "contrast control".

FIGS. 6A and 6B are diagrams for explaining the contrast control. The horizontal axis represents the pixel value of the camera image. The vertical axis represents the corresponding light intensity for the mesh.

Figure 7A:
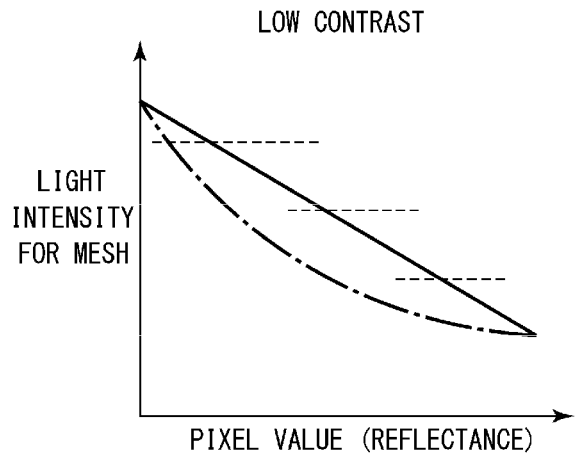
FIG. 7A is a diagram for explaining low-contrast control.

FIG. 7A is a diagram for explaining low-contrast control. In the low-contrast control, the light intensity is set according to the brightness of the illumination target, i.e., according to the pixel value. Specifically, the light intensity is reduced according to an increase in the brightness of an object, and is raised according to a reduction in the brightness thereof. This reduces a difference in brightness between a dark portion and a bright portion. In particular, this raises the visibility for a dark portion. It should be noted that, in addition to the low-contrast control based on a monotonically decreasing linear function as indicated by the solid line, the low-contrast control may be provided in a discrete manner based on a monotonically decreasing stepwise function as indicated by the broken line. Also, the low-contrast control may be provided based on a nonlinear function as indicated by the curve of alternately long and short dashes. Alternatively, the light intensity for each mesh may be controlled by feedback control such that the pixel value thereof approaches a predetermined target value.

Figure 7B:
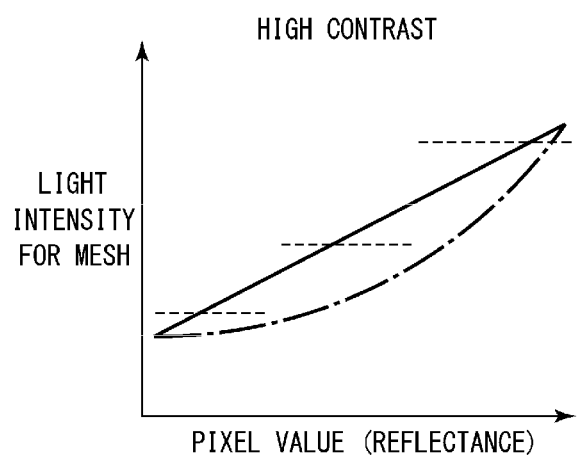
FIG. 7B is a diagram for explaining high-contrast control.

FIG. 7B is a diagram for explaining high-contrast control. In the high-contrast control, the light intensity is set according to the brightness of the illumination target, and specifically, is raised according to an increase in the brightness of an object, and is reduced according to a reduction in the brightness thereof. This increases a difference in brightness between a dark portion and a bright portion. The view having such a large brightness difference provides an advantage in that the human eye can easily recognize the position and the shape of an object instantaneously. In addition to the high-contrast control based on a monotonically increasing linear function, the high-contrast control may be provided based on a monotonically increasing stepwise function as indicated by the broken line. Also, the high-contrast control may be provided based on a nonlinear function as indicated by the curve of alternately long and short dashes.

Figure 8:
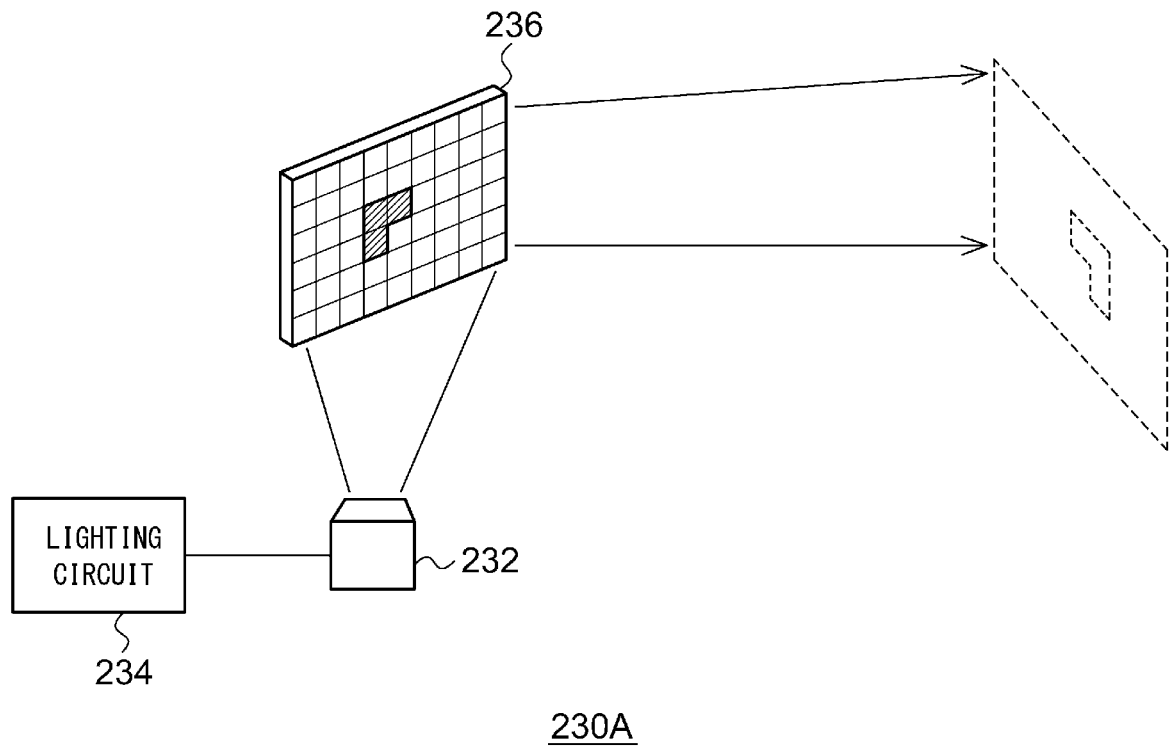
FIG. 8 is a diagram showing an example configuration of a light source unit.

Next, description will be made regarding an example configuration of the light source unit 230. FIG. 8 is a diagram showing an example configuration of the light source unit 230. A light source unit 230A shown in FIG. 8 includes a light source 232, a lighting circuit 234, and a patterning device 236. In addition, the light source unit 230A may include an unshown reflection optical system or transmission optical system.

As the light source 232, a high-luminance semiconductor light source such as an LED or LD may preferably be employed. The lighting circuit 234 supplies a stabilized driving current (lamp current) to the light source 232 such that the light source 232 emits light with a predetermined luminance. The output light emitted from the light source 232 is input to the patterning device 236.

As the patterning device 236, a DMD or a liquid crystal panel may be employed. The DMD is configured as an array of micromirror devices each having a reflection angle that can be controlled independently. Specifically, the DMD is configured such that the effective reflectance can be controlled for each micromirror device in a multiple gradations. On the other hand, the liquid crystal panel is configured as an array of pixels each having a transmissivity that can be controlled independently. Specifically, the liquid crystal panel is configured such that the transmissivity can be controlled for each pixel in a multiple gradations.

Figure 9:
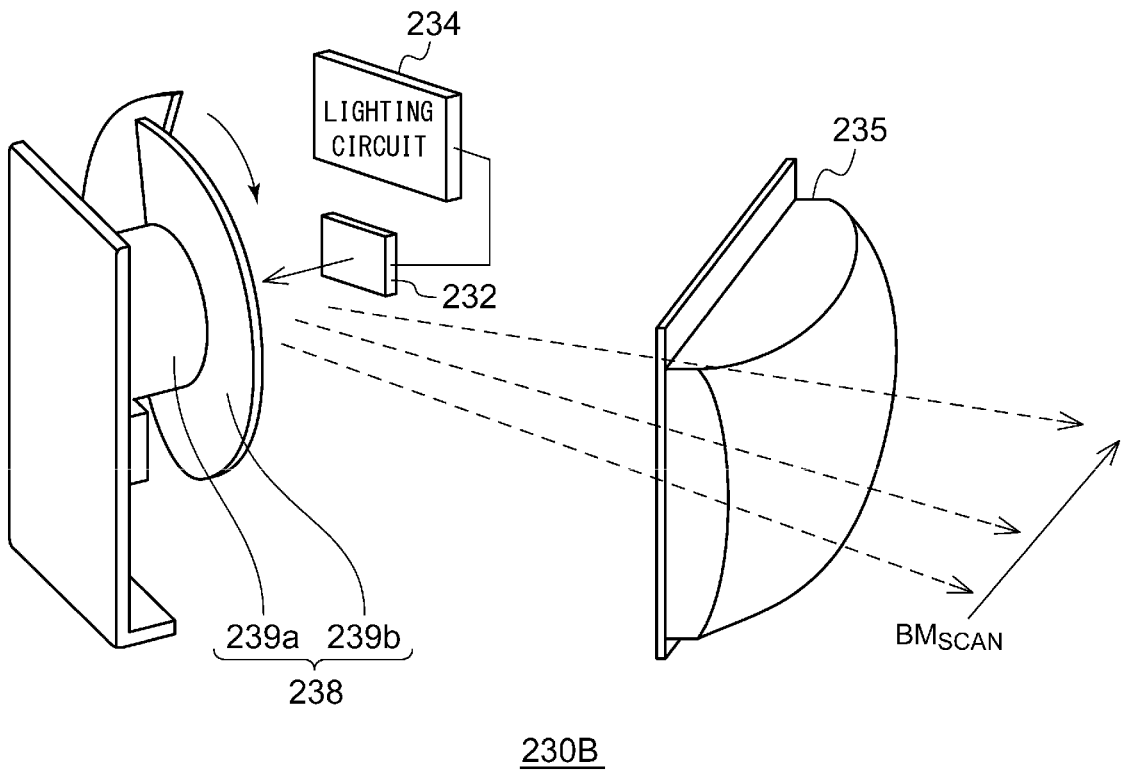
FIG. 9 is another example configuration of the light source unit.

FIG. 9 is a diagram showing another example configuration of the light source unit 230. A light source unit 230B shown in FIG. 9B is configured as a scanning lighting device including a light source 232, a lighting circuit 234, and a scanning optical system 238. The scanning optical system 238 is configured to be capable of scanning an output beam emitted from the light source 232. For example, the scanning optical system 238 may include a motor 239a and a reflector (blade) 239b attached to a rotational shaft of the motor 239a. When the motor 239a is rotated, the angle defined by the reflection face of the reflector 239b and the output beam changes, thereby scanning the scanning beam $BM_{SCAN}$. A projector optical system 235 configured as a transmission optical system or a reflection optical system may be arranged on an optical path of the scanning beam $BM_{SCAN}$.

Description has been made above regarding an aspect of the present invention based on the first embodiment. Next, description will be made regarding modifications relating to the first embodiment.

Modification 1

Description has been made in the embodiment regarding an arrangement in which the control mode is adaptively switched by the mode controller 224. Also, an arrangement may be made configured to allow the driver to manually select the control mode. There are differences in the characteristics of the cells of the human eye between individuals. Also, there are also differences in the user's desired light distribution pattern between individuals. Accordingly, by providing the driver with the freedom to select the control mode, such an arrangement enables the realization of light distribution patterns suitable for individual drivers.

Modification 2

Also, an arrangement may be made configured to allow the driver to input a parameter to be referenced when the control mode is to be automatically controlled. This allows the control mode to be switched to a suitable control mode for each driver.

Modification 3

Description has been made in the embodiment regarding an arrangement configured giving consideration to the limitations of the processing speed supported by the hardware component of the control unit 220. However, the present invention is not restricted to such an arrangement. Also, the control unit 220 may be configured to operate in the range 910 that corresponds to the maximum resolution and the maximum update speed shown in FIG. 5. This arrangement also provides the advantage of the present invention.

Modification 4

Description has been made in the embodiment regarding processing mainly with a principal objective of providing improved driver visibility. However, the present invention is not restricted to such an arrangement. It is important for automated driving or semi-automated driving to detect a target by means of an in-vehicle camera. Accordingly, the control mode may be adaptively switched so as to allow the in-vehicle camera to easily recognize a target.

Second Embodiment

Figure 10:
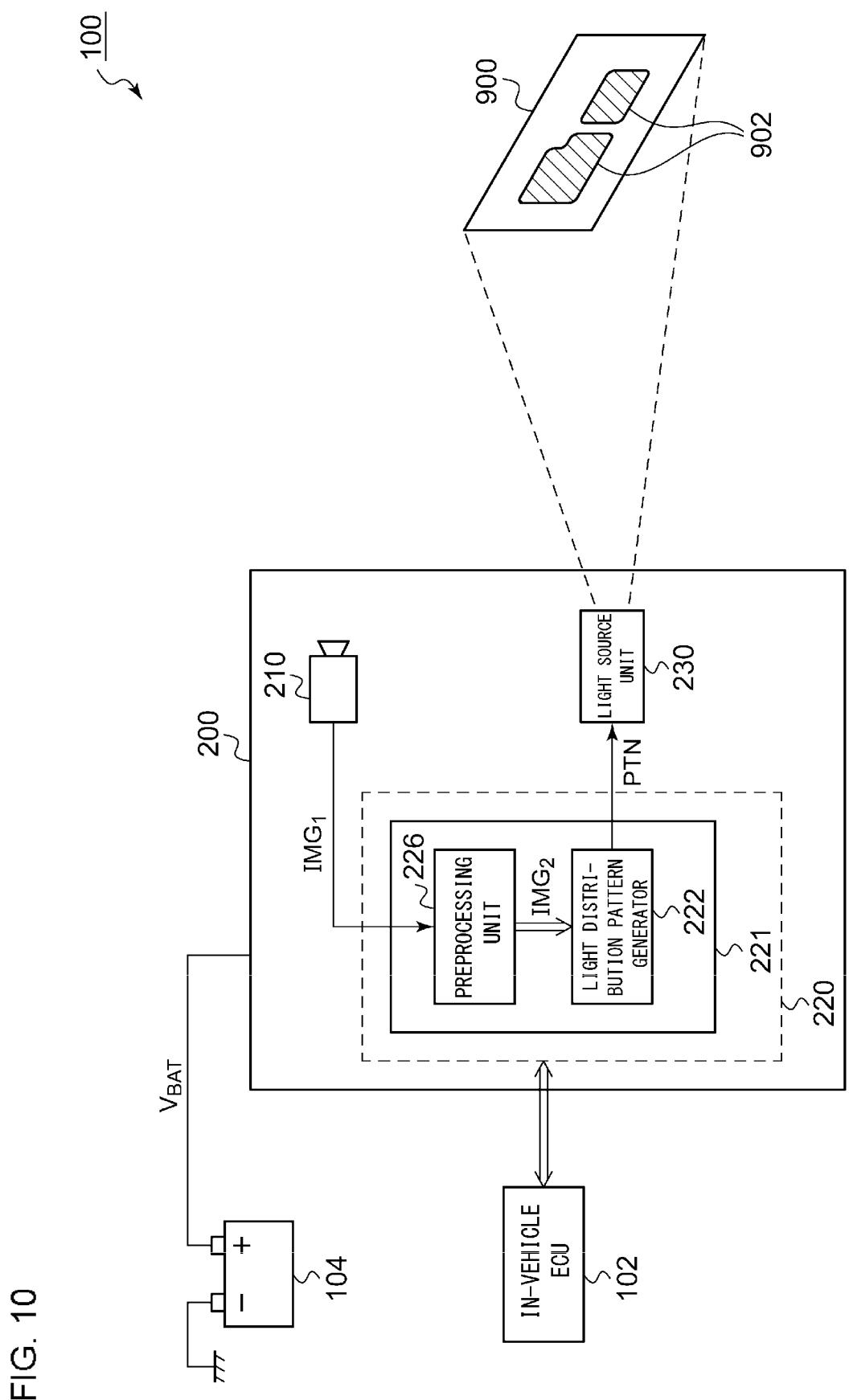
FIG. 10 is a block diagram showing an automotive lamp system according to a second embodiment.

FIG. 10 is a block diagram showing an automotive lamp system according to a second embodiment. An automotive lamp system 100 includes an automotive lamp 200, an in-vehicle ECU (Electronic Control Unit) 102, and a battery 104. The battery voltage $V_{BAT}$ generated by the battery 104 is supplied to the in-vehicle lighting deice 200 as a power supply voltage. The in-vehicle ECU 102 and the automotive lamp 200 are each configured to conform to a protocol such as CAN (Controller Area Network), LIN (Local Internet Network), or the like, which allows these devices to communicate with each other. The in-vehicle ECU 102 controls the on/off state of the automotive lamp 200. Furthermore, the in-vehicle ECU 102 transmits vehicle information such as vehicle speed information, steering information, etc., to the automotive lamp 200. Furthermore, this arrangement allows the automotive lamp 200 to transmit a fail signal or the like to the in-vehicle ECU 102.

The automotive lamp 200 is configured to dynamically and adaptively control a light distribution pattern PTN based on an image (which will also be referred to as "initial image data $IMG_1$" hereafter) captured by a camera unit 210. It should be noted that the initial image data $IMG_1$ corresponds to a single piece of frame data that forms a moving image. The camera unit 210 may include only a single camera. Also, the camera unit 210 may include multiple cameras configured with different resolutions and/or different frame rates. In a case in which the camera unit 210 includes multiple cameras, the initial image data $IMG_1$ collectively represents the output data of the multiple cameras.

The light distribution pattern PTN represents a two-dimensional light intensity distribution having an illumination pattern 902 formed by the automotive lamp 200 on a virtual vertical screen 900 ahead of the user's vehicle. In order to generate the light distribution pattern PTN, the automotive lamp 200 includes a control unit (control apparatus) 220 and a light source unit 230. The control unit 220 is also referred to as a "lighting device ECU").

The light distribution pattern PTN is divided into multiple meshes (individual regions). Each mesh is provided with a uniform light intensity. The spatial resolution of the light distribution pattern PTN corresponds to the fineness (roughness) of the meshes. As the resolution of the light distribution pattern, one from among WUXGA (1920×1200), FHD (1920×1080), FWXGA (1366×768 or 1280×720), SXGA (1280×1024), WXGA (1280×800), WVGA (800×480), VGA (640×480), and QVGA (320×240) may be employed. However, the present invention is not restricted to such an example. Also, the resolution that can be employed may be further reduced. Also, as the resolution that can be employed, a finer resolution that corresponds to 4K or 8K may be employed.

Figure 11A:
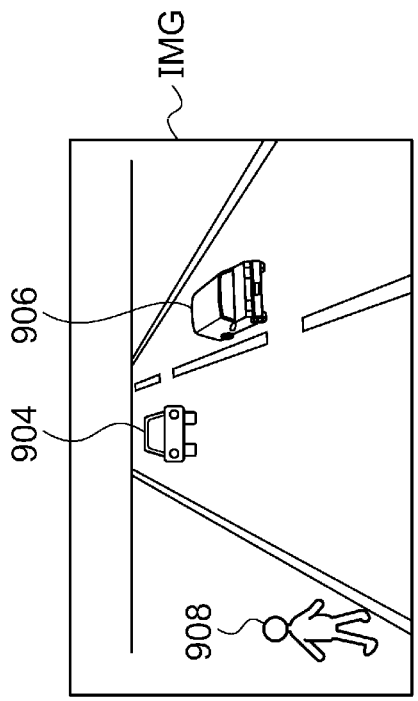
FIGS. 11A through 11C are diagrams for explaining the resolution of the light distribution pattern.
Figure 11B:
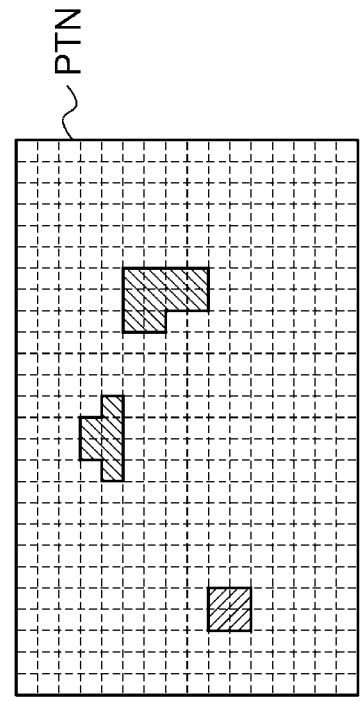
Figure 11C:
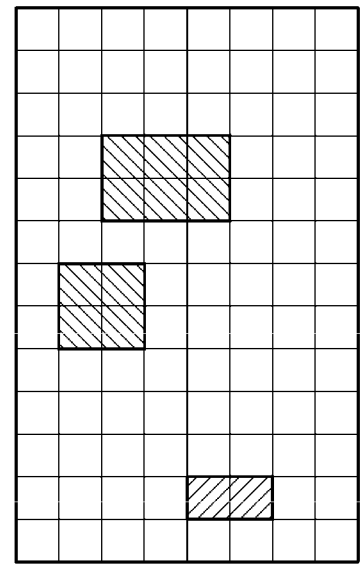

FIGS. 11A through 11C are diagrams for explaining the light distribution pattern PTN. FIG. 11A shows an example of the initial image data $IMG_1$. FIGS. 11B and 11C are diagrams each showing an example of the light distribution pattern PTN that corresponds to the initial image data $IMG_1$ shown in FIG. 11A. Here, for ease of description, description will be made regarding an example in which a predetermined target is extracted from the initial image data $IMG_1$, and a particular mesh where the predetermined target exists is shielded (i.e., with the light intensity of zero). Such a predetermined target is a target to which glare is not to be imparted. Examples of such a predetermined target include a leading vehicle 904, an oncoming vehicle 906, and a pedestrian 908. In FIGS. 11B and 11C, the region to be shielded is hatched. FIG. 11B shows a light distribution pattern PTN having a resolution that is higher than that shown in FIG. 11C. In a case in which the light distribution pattern is generated with higher resolution, this arrangement is capable of providing higher-precision shielding according to the shape of the predetermined target.

In a case of further raising the resolution of the light distribution pattern PTN, this arrangement allows only a rear window portion of the leading vehicle 904 or only a front window portion of the oncoming vehicle 906 to be shielded while proactively raising the light intensity for the vehicle body. Similarly, such an arrangement allows only the face portion of the pedestrian 908 to be shielded while proactively raising the light intensity for the body portion. This allows the driver's visibility to be further improved while preventing the occurrence of glare.

Returning to FIG. 10, description will be made regarding a specific configuration of the automotive lamp 200. The automotive lamp 200 includes a control unit 220 and a light source unit 230 in addition to the camera unit 210. It should be noted that FIG. 10 shows an arrangement in which the camera unit 210 is built into the automotive lamp 200. Also, the camera unit 210 may be provided on the vehicle side.

The control unit 220 integrally controls the automotive lamp 200. The control unit 220 includes an image processing unit 221 and an unshown different processing unit. The image processing unit 221 may be configured as a digital processor. For example, the image processing unit 221 may be configured as a combination of a CPU or a microcontroller and a software program. Also, the image processing unit 221 may be configured as an FPGA (Field Programmable Gate Array), ASIC (Application Specified IC), or the like.

A preprocessing unit 226 receives the initial image data $IMG_1$ captured by the camera unit 210, and generates intermediate image data $IMG_2$ that corresponds to the initial image data $IMG_1$.

The effective number of gradations to be used in the intermediate image data $IMG_2$ is determined for each pixel such that it is smaller than the number of gradations employed in the initial image data $IMG_1$ when the pixel value of the corresponding pixel of the initial image data $IMG_1$ is included within the predetermined range RNG. For ease of understanding, description will be made in the present embodiment regarding an arrangement in which such image data is configured as a monochrome image. Also, such image data may be configured as a color image. When the intermediate image data $IMG_2$ is to be generated based on the initial image data $IMG_1$, the preprocessing unit 226 may perform image processing for reducing the resolution.

The light distribution pattern generator 222 generates light intensity control data that defines a light intensity distribution (light distribution pattern PTN) of the automotive lamp 200 based on the intermediate image data $IMG_2$. The generating method for the light distribution pattern PTN based on the intermediate image data $IMG_2$ is not restricted in particular. The light intensity provided to individual regions (meshes) included in the light distribution pattern PTN is determined based on the values (pixel values) of the corresponding pixels of the intermediate image data $IMG_2$.

The light source unit 230 is configured to receive the light intensity control data for indicating the light distribution pattern PTN from the light distribution pattern generator 222, and to form a light intensity distribution in a region ahead of the vehicle according to the light distribution pattern PTN. The configuration of the light source unit 230 is not restricted in particular. For example, the light source unit 230 may include a semiconductor light source such as an LD (laser diode), LED (light-emitting diode), or the like, and a lighting circuit that drives the semiconductor light source so as to turn on the semiconductor light source. In order to form the light intensity distribution that corresponds to the light distribution pattern PTN, the light source unit 230 may include a matrix pattern forming device such as a DMD (Digital Mirror Device), liquid crystal device, or the like.

Figure 12:
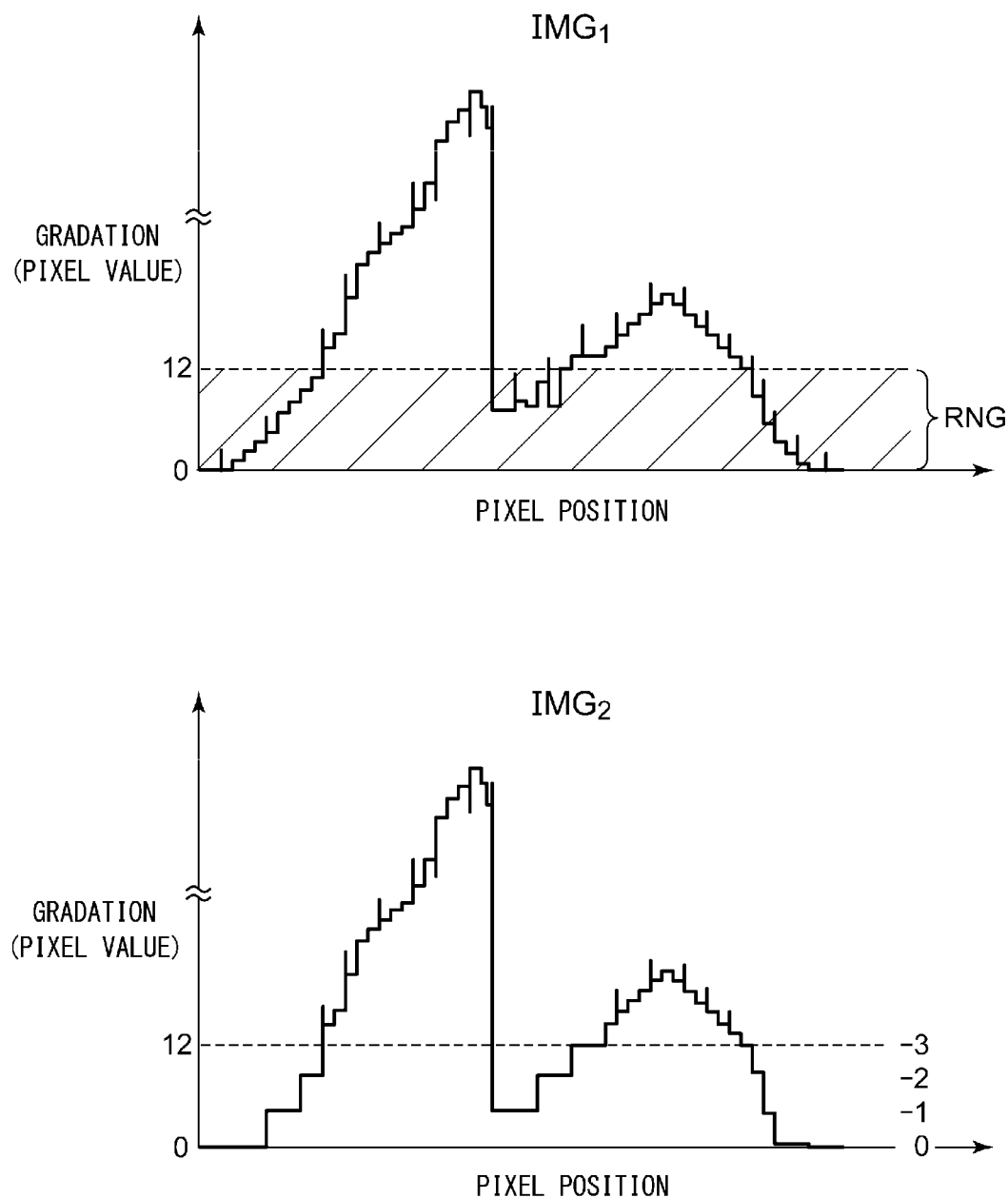
FIG. 12 is a diagram for explaining signal processing for the automotive lamp shown in FIG. 10.

The above is the configuration of the automotive lamp 200. Next, description will be made regarding the operation thereof. FIG. 12 is a diagram for explaining the signal processing for the automotive lamp 200 shown in FIG. 10. For simplification of description, FIG. 12 shows a simple example in which image data is configured as one-dimensional image data. The predetermined range RNG to be subjected to processing for reducing the number of gradations is hatched. In this example, twelve gradations, i.e., the pixel values 0 through 11, are employed as the predetermined range RNG. Referring to the intermediate image data $IMG_2$, the effective number of gradations of the predetermined range RNG is reduced to 3.

The initial image data $IMG_1$, which is original image data, includes noise N in the form of random noise. From among the noise, the noise included in the predetermined range RNG can be removed by reducing the number of gradations.

It should be noted that as the processing for reducing the number of gradations, several lower bits may be rounded (rounding-up or rounding-down processing). In the example shown in FIG. 12, the lower two bits are set to zero as the rounding processing. The number of lower bits to be rounded, i.e., the degree of reducing the number of gradations, may preferably be determined giving consideration to the amplitude of the noise N and the effects of the noise N on the light distribution pattern generated in a final stage. Accordingly, the image processing unit 221 may change the degree of reducing the number of gradations according to the amplitude of noise included in the initial image data $IMG_1$ (i.e., S/N ratio).

The above is the operation of the automotive lamp 200. With the automotive lamp 200, from among the pixels included in the initial image data $IMG_1$, for pixels where there is a noticeable noise effect on the final light intensity distribution, the effective number of gradations is reduced for such pixels. Such an arrangement is capable of forming a light distribution with reduced noise effects due to the camera. Furthermore, by reducing the number of gradations for only the hatched predetermined range RNG, this arrangement allows the original high number of gradations to be maintained for the other ranges where noise is not noticeable.

The present invention encompasses various kinds of apparatuses, circuits, and methods that can be regarded as a block configuration or a circuit configuration shown in FIG. 10, or that can be derived from the aforementioned description.

That is to say, the present invention is not restricted to a specific configuration. More specific description will be made below regarding an example configuration for clarification and ease of understanding of the essence of the present invention and the circuit operation. That is to say, the following description will by no means be intended to restrict the technical scope of the present invention.

Detailed description will be made with reference to several examples regarding the relation between image processing supported by the light distribution pattern generator 222 and generation of the intermediate image data.

FIRST EXAMPLE

FIG. 13 is a diagram for explaining image processing according to a first example. As a simplest example, the light distribution pattern generator 222 may perform control in which a predetermined target is detected based on the initial image data $IMG_1$, and a portion that corresponds to the target thus detected is shielded (or the light intensity is reduced). Examples of an object to be shielded include an oncoming vehicle, leading vehicle, light-emitting object such as a streetlight, electronic bulletin board, or the like, etc. The oncoming vehicle and the leading vehicle are required to be shielded from the viewpoint of suppressing the occurrence of glare. Also, it is meaningless to emit light from a headlamp to a light-emitting object such as a streetlight, electronic bulletin board, or the like.

Accordingly, the image processing unit 221 may perform control such that, when a pixel value of the initial image data $IMG_1$ exceeds a predetermined threshold value TH, the image processing unit 221 may judge that there is a high probability of the existence of a light-emitting object in a given region, and may perform control so as to shield the given region (or may reduce the light intensity for the given region).

In a case of providing such control, when a pixel value of the initial image data $IMG_1$ is in the vicinity of the threshold value TH, the pixel value on which noise has been superimposed crosses the threshold value TH. In this case, an undesired shielded region is formed according to random noise. This situation is shown as the light distribution pattern in the third graph from the top in FIG. 13.

In order to solve such a problem, the predetermined range RNG and the number of gradations of the intermediate image data to be set for the predetermined range RNG are determined according to the noise amplitude and the threshold value TH. This arrangement allows the noise effects to be reduced. This effect is shown as the light distribution pattern in the fourth graph from the top in FIG. 13.

SECOND EXAMPLE

The light distribution pattern generator 222 reduces the contrast of the view ahead of the vehicle based on the initial image data $IMG_1$. Also, the light distribution pattern generator 222 may support an operation for raising the contrast. The "contrast" as used here represents the brightness ratio between a dark portion and a bright portion.

More specifically, in order to reduce the contrast, the light intensity may preferably be raised for a dark portion (low-reflectance portion). Conversely, the light intensity may preferably be lowered for a bright portion. In other words, the light intensity may preferably be adjusted according to the brightness of the illumination target. Specifically, the light intensity may preferably be lowered according to an increase in the brightness of an object, i.e., may preferably be raised according to a reduction in the brightness thereof. That is to say, each individual region of the light distribution pattern may preferably be adjusted such that the light intensity is raised according to a reduction in the pixel value of the corresponding pixel of the initial image data $IMG_1$, i.e., is lowered according to an increase in the pixel value. In the present specification, this processing will be referred to as "low-contrast control".

Figure 14A:
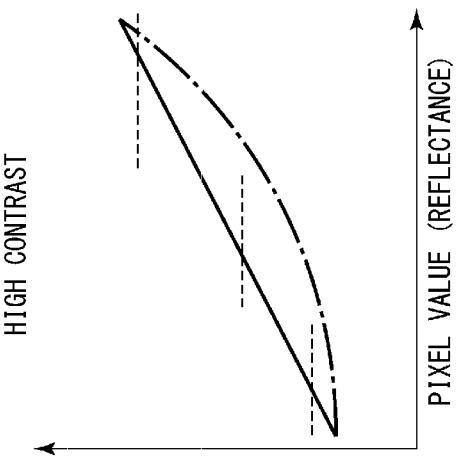
FIG. 14A is a diagram for explaining low-contrast control.

FIG. 14A is a diagram for explaining the low-contrast control. This reduces the brightness difference between a dark portion and a bright portion. Accordingly, in particular, this allows the visibility to be improved for a dark portion. It should be noted that, in addition to the low-contrast control based on a monotonically decreasing linear function as indicated by the solid line, the low-contrast control may be provided in a discrete manner based on a monotonically decreasing stepwise function as indicated by the broken line. Also, the low-contrast control may be provided based on a nonlinear function as indicated by the curve of alternately long and short dashes. Alternatively, the light intensity for each mesh may be controlled by feedback control such that the pixel value thereof approaches a predetermined target value.

Figure 14B:
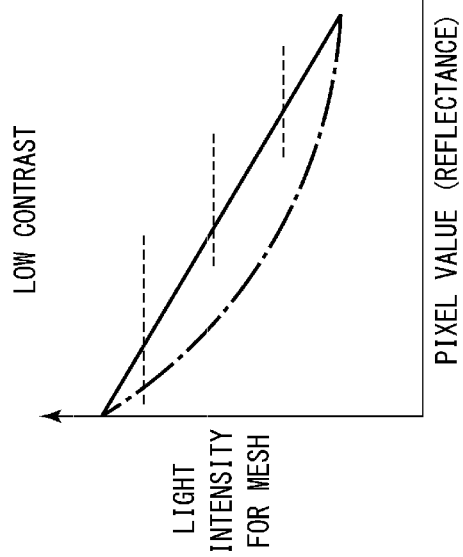
FIG. 14B is a diagram for explaining high-contrast control.

Conversely, in order to raise the contrast, the light intensity may preferably be lowered for a dark portion (low-reflectance portion), and may preferably be raised for a bright portion. In other words, the light intensity is set according to the brightness of the illumination target. That is to say, the light intensity is raised according to an increase in the brightness of an object, and is lowered according to a reduction in the brightness thereof. That is to say, each individual region of the light distribution pattern may preferably be adjusted such that the light intensity is lowered according to a reduction in the pixel values of the corresponding pixels of the initial image data $IMG_1$, and is raised according to an increase in the pixel values. In the present specification, this processing will be referred to as "high-contrast control". FIG. 14B is a diagram for explaining the high-contrast control. The high-contrast control provides an increase in the brightness difference between a dark portion and a bright portion. A view having a large brightness difference has an advantage of allowing the human eye to recognize the position and the shape of an object instantaneously. In addition to the high-contrast control based on a monotonically increasing linear function, the high-contrast control may be provided based on a monotonically increasing stepwise function as indicated by the broken line. Also, the high-contrast control may be provided based on a nonlinear function as indicated by the curve of alternately long and short dashes.

Figure 15:
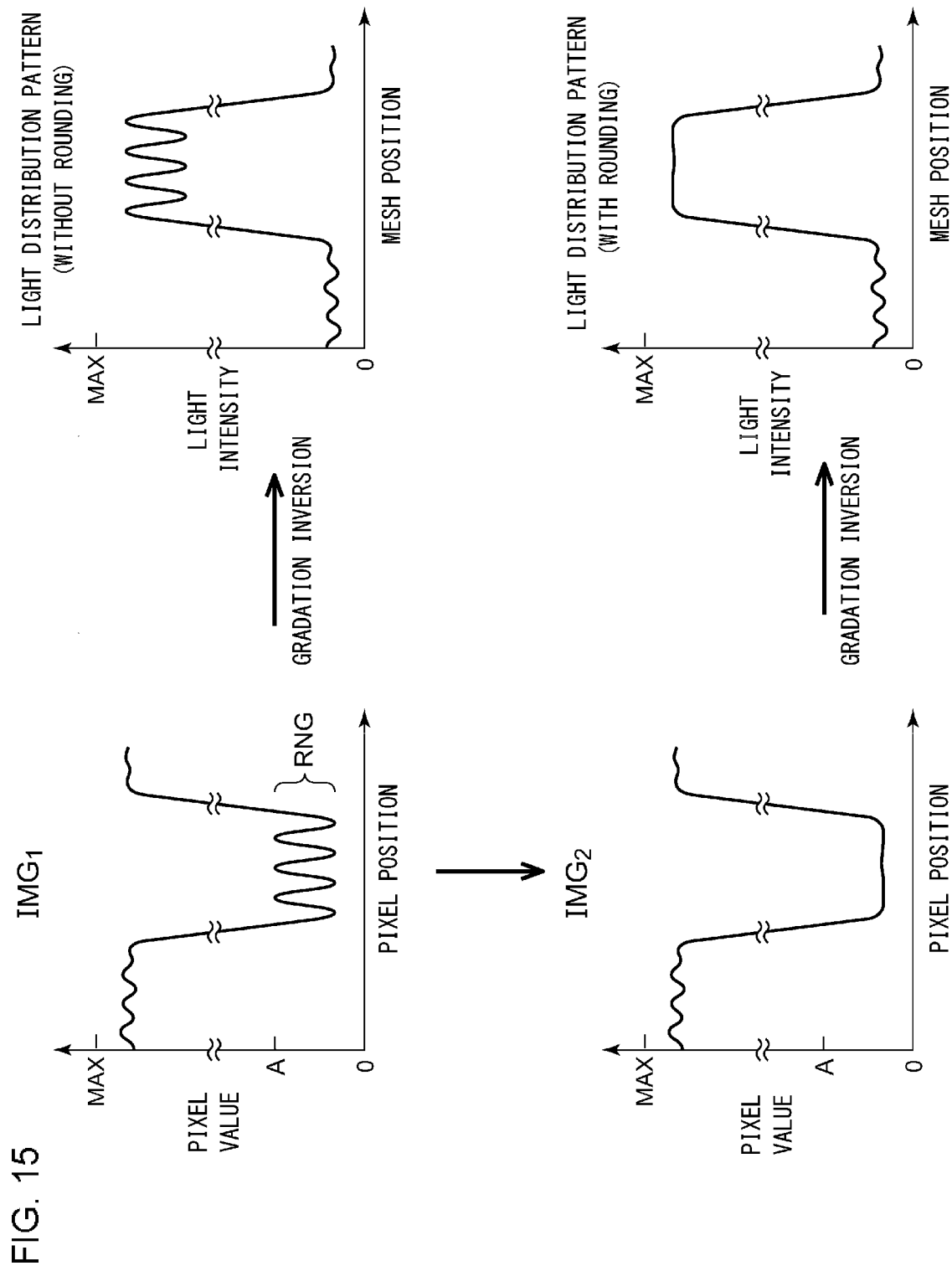
FIG. 15 is a diagram for explaining image processing according to a second embodiment.

FIG. 15 is a diagram for explaining the image processing according to the second example. Description will be made below regarding an arrangement in which the low-contrast control shown in FIG. 14A is provided by gradation inversion. For example, with the maximum gradation as MAX, and with the pixel value of a given pixel as X, the inverted gradation Y is represented by the following Expression.

$Y = MAX - X$

In a case in which the initial image data $IMG_1$ is directly subjected to gradation inversion, the low-gradation range is displaced to the high-gradation range. Accordingly, the noise included in the low-gradation range of the initial image data $IMG_1$ is shifted to the high-intensity range, leading to noticeable noise (without rounding, as shown in the upper-right graph in FIG. 15). Specifically, dark spots due to noise are included in the bright region of the light distribution pattern, leading to the potential to degrade the visibility.

In order to solve such a problem, instead of subjecting the initial image data $IMG_1$ to gradation inversion without preprocessing, the intermediate image data $IMG_2$ is generated based on the initial image data $IMG_1$ such that the pixel values in the low-gradation range (0 to A) are rounded, and the intermediate image data $IMG_2$ is subjected to gradation inversion. This allows noise to be reduced in a high light intensity range (with rounding, as shown in the lower-right graph in FIG. 15).

In summary, the following technical idea can be derived. That is to say, the image processing unit 221 may preferably determine the predetermined range RNG so as to reduce noise included in the light intensity range where noise is noticeable in the light intensity distribution. With the pixel value as X, and with the corresponding light intensity as Y, the relation between them can be assumed to be represented by an arbitrary function.

$$Y=f(x)$$

In this case, in a case in which the light intensity distribution includes noise, with the upper limit and the lower limit of the light intensity range where the noise becomes noticeable as $Y_{MAX}$ and $Y_{MIN}$, the pixel values $X_{MAX}$ and $X_{MIN}$ that respectively correspond to $Y_{MAX}$ and $Y_{MIN}$ are represented by the following Expressions.

$$X_{MAX}=f^{-1}(Y_{MAX})$$

$$X_{MIN}=f^{-1}(Y_{MIN})$$

Here, $f^{-1}$ represents the inverse function of the function f. Accordingly, the upper limit and the lower limit of the predetermined range may preferably be determined to be) $X_{MAX}$ and $X_{MIN}$, respectively. It should be noted that, in some cases, the relation $X_{MAX}>X_{MIN}$ holds true. Also, in some cases, the relation $X_{MAX}<X_{MIN}$ holds true.

THIRD EXAMPLE

Figure 16A:
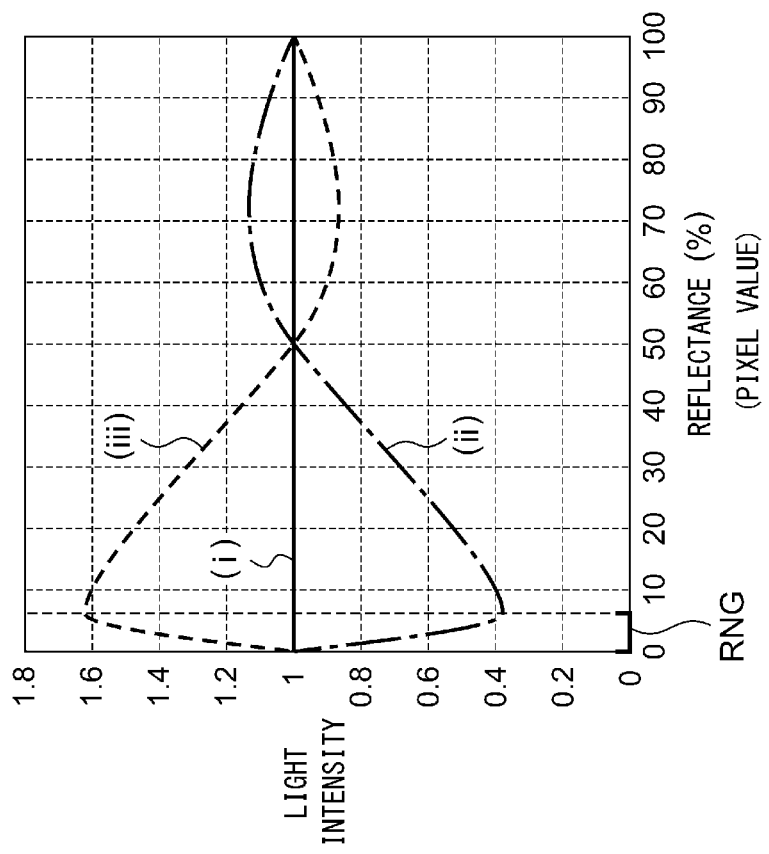
FIGS. 16A and 16B are diagrams for explaining contrast control according to a third example.
Figure 16B:
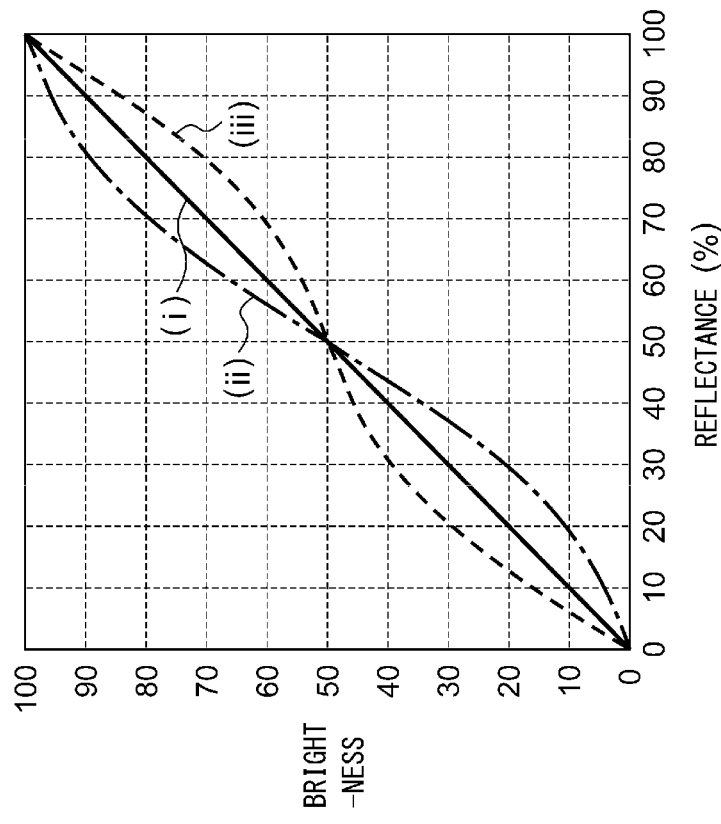

Description will be made regarding another example of the contrast control. FIGS. 16A and 16B are diagrams for explaining the contrast control according to a third example. FIG. 16A shows the relation between the reflectance (%) of an object and the brightness. In a case in which light is emitted with a constant light intensity independent of the subject, as shown in (i), a proportional relation holds true between the brightness of the object and the reflectance. A "high-contrast image" as used in the so-called image processing field has a gradation distribution as shown in (ii). In some cases, a low-contrast image has a gradation distribution as shown in (iii).

FIG. 16B shows the relation between the reflectance of an object and the light intensity (normalized relative value). The reflectance of the object can be represented by the pixel value. In both the high-contrast control and the low-contrast control, the relation between the reflectance and the light intensity has a large slope in a range where the reflectance is low. This means that the noise amplitude is amplified in a low-gradation range of the pixel values. Accordingly, in a case in which the contrast control is performed as shown in FIG. 16A, the low-gradation range may preferably be set to the predetermined range RNG where the rounding is to be performed before generating the intermediate image data $IMG_2$.

In summary, the following technical idea can be derived. That is to say, with the image processing unit 221, in a case in which there is a gradation range where the noise amplitude is amplified, the gradation range may preferably be set to the predetermined range RNG before the light intensity is calculated (using a function) based on the pixel values.

With the pixel value as X, and with the light intensity that corresponds to the pixel value X as Y, the relation between them is assumed to be represented by an arbitrary function.

$$Y=f(X)$$

The range where noise is amplified with a high amplification factor is a range where the function f(X) has a large slope. Such a range corresponds to a range where the differential function f'(X) has a large absolute value. Accordingly, with the pixel value that provides the maximum value of the slope |f'(X)| as $X_{MAX}$, the predetermined range RNG may preferably be determined such that it includes the pixel value $X_{MAX}$.

Description has been made above regarding an aspect of the present invention based on the second embodiment. Next, description will be made regarding modifications relating to the second embodiment.

Modification 1

Description has been made in the embodiments regarding a countermeasure for suppressing noise mainly from the viewpoint of the driver. However, the present invention is not restricted to such an arrangement. It is important for automated driving or semi-automated driving to detect a target by means of an in-vehicle camera. Accordingly, the predetermined range RNG where rounding is to be performed may be determined so as to reduce undesired noise from the viewpoint of the in-vehicle camera.

Modification 2

Description has been made in the embodiments regarding an example in which, when a bright region of the light distribution pattern includes dark spots due to noise, this leads to degradation of visibility. However, the present invention is not restricted to such an arrangement. The human eye has higher sensitivity for a change in brightness in a dark region than for a change in brightness in a bright region. From this viewpoint, when a dark region of the light distribution pattern includes bright spots due to noise, in some cases, such a light distribution pattern is unpleasant. Accordingly, in this case, the predetermined range RNG may preferably be determined so as to reduce noise included in a dark gradation range where the light intensity is low.

Modification 3

Description has been made in the embodiments regarding an example in which, as the rounding processing for reducing the number of gradations, bit rounding down (rounding up) is employed. However, the present invention is not restricted to such an arrangement. When a pixel value is included within the predetermined range RNG, the pixel value may be multiplied by a coefficient that is smaller than 1 so as to reduce the effective number of gradations. This processing is effective in a case in which the predetermined range RNG is configured as a low-gradation range.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

What is claimed is:

1. An automotive lamp adaptive to control a light distribution pattern based on an image captured by a camera, and adaptive to switch a plurality of control modes with different combinations of a spatial resolution of the light distribution pattern and an update speed of the light distribution pattern, the light distribution pattern representing a two-dimensional light intensity distribution of a headlight, wherein the plurality of control modes include a first mode in which the light distribution pattern is generated with relatively high resolution and relatively low speed, and a second mode in which the light distribution pattern is generated with relatively low resolution and relatively high speed.

2. The automotive lamp according to claim 1, wherein a control mode of the plurality of control modes is adaptively selected according to a driving environment.

3. The automotive lamp according to claim 1, wherein a control mode of the plurality of control modes is adaptively selected according to environmental illumination.

4. The automotive lamp according to claim 3, wherein the environmental illumination is detected based on the image captured by the camera.

5. The automotive lamp according to claim 1, wherein a control mode of the plurality of control modes is adaptively selected according to a driving speed.

6. The automotive lamp according to claim 1, wherein a control mode of the plurality of control modes is adaptively selected according to a speed of an illumination target.

7. The automotive lamp according to claim 1, wherein a control mode of the plurality of control modes is selected based on a spatial frequency of the image captured by the camera.

8. The automotive lamp according to claim 1, wherein a control mode of the plurality of control modes is adaptively selected based on a kind of a road on which a user's vehicle is traveling.

9. The automotive lamp according to claim 1, wherein the image captured by the camera is divided into a plurality of sub-regions,
and wherein a control mode of the plurality of control modes is set for each sub-region.

10. An automotive lamp comprising:
a light distribution pattern generator structured to generate a light distribution pattern based on an image captured by a camera;
a light source unit structured to emit light to a region ahead of a vehicle according to the light distribution pattern; and
a mode controller structured to adaptively control a combination of a spatial resolution of the light distribution pattern and an update speed at which the light distribution pattern is updated, the light distribution pattern representing a two-dimensional light intensity distribution of a headlight and including a first mode in which the light distribution pattern is generated with relatively high resolution and relatively low speed, and a second mode in which the light distribution pattern is generated with relatively low resolution and relatively high speed.

* * * * *